(12) United States Patent
Son et al.

(10) Patent No.: US 11,996,963 B2
(45) Date of Patent: May 28, 2024

(54) METHOD FOR WIRELESS COMMUNICATION WITH WIRELESS COMMUNICATION TERMINAL FOR LONG DISTANCE TRANSMISSION AND WIRELESS COMMUNICATION TERMINAL USING SAME

(71) Applicants: HUMAX NETWORKS, INC., Gyeonggi-do (KR); WILUS INSTITUTE OF STANDARDS AND TECHNOLOGY INC., Gyeonggi-do (KR)

(72) Inventors: Juhyung Son, Gyeonggi-do (KR); Jinsam Kwak, Gyeonggi-do (KR); Bonho Koo, Seoul (KR); Kiwon Kang, Gyeonggi-do (KR)

(73) Assignees: HUMAX NETWORKS, INC., Gyeonggi-Do (KR); WILUS INSTITUTE OF STANDARDS AND TECHNOLOGY INC., Gyeonggi-Do (KR)

(*) Notice: Subject to any disclaimer, the term of this patent is extended or adjusted under 35 U.S.C. 154(b) by 47 days.

(21) Appl. No.: 17/227,281

(22) Filed: Apr. 10, 2021

(65) Prior Publication Data
US 2021/0306190 A1 Sep. 30, 2021

Related U.S. Application Data

(63) Continuation of application No. 16/347,578, filed as application No. PCT/KR2017/012552 on Nov. 7, 2017, now Pat. No. 10,979,266.
(Continued)

(30) Foreign Application Priority Data

Nov. 25, 2016 (KR) .................. 10-2016-0158297

(51) Int. Cl.
H04L 27/26 (2006.01)
H04L 5/00 (2006.01)
H04W 74/0833 (2024.01)

(52) U.S. Cl.
CPC ........ *H04L 27/2602* (2013.01); *H04L 5/0007* (2013.01); *H04L 5/0048* (2013.01);
(Continued)

(58) Field of Classification Search
CPC ... H04L 1/1848; H04L 5/0007; H04L 1/1671; H04L 1/1614; H04L 5/0055; H04L 1/16;
(Continued)

(56) References Cited

U.S. PATENT DOCUMENTS

2013/0016642 A1 1/2013 Banerjea et al.
2013/0051260 A1 2/2013 Liu
(Continued)

FOREIGN PATENT DOCUMENTS

KR 10-2014-0018248 2/2014
KR 10-2014-0043785 4/2014
(Continued)

OTHER PUBLICATIONS

International Search Report for PCT/KR2017/012552 dated Mar. 13, 2018 and its English translation from WIPO (now published as WO 2018/084689).
(Continued)

*Primary Examiner* — Yee F Lam
(74) *Attorney, Agent, or Firm* — Ladas & Parry, LLP

(57) ABSTRACT

Provided is a base wireless communication terminal. The base wireless communication terminal includes a transceiver and a processor. The processor is configured to transmit a mixed Physical Layer Protocol Data Unit (PPDU) including both data for a Long Range (LR) wireless communication terminal and data for a non-LR wireless communication
(Continued)

terminal to the LR wireless communication terminal and the non-LR wireless communication terminal using the transceiver. The LR PPDU including only the data for the LR wireless communication terminal has a narrower bandwidth than a bandwidth of the non-LR PPDU including only the data for the non-LR wireless communication terminal.

14 Claims, 13 Drawing Sheets

Related U.S. Application Data

(60) Provisional application No. 62/418,295, filed on Nov. 7, 2016.

(52) U.S. Cl.
CPC ........ *H04L 5/0083* (2013.01); *H04L 27/2605* (2013.01); *H04L 27/261* (2013.01); *H04L 27/2662* (2013.01); *H04L 27/2675* (2013.01); *H04W 74/0833* (2013.01); *H04L 27/2603* (2021.01)

(58) Field of Classification Search
CPC ..... H04L 69/324; H04L 12/1868; H04L 1/18; H04L 1/1685; H04W 84/12; H04W 72/042; H04B 7/0452
See application file for complete search history.

(56) References Cited

U.S. PATENT DOCUMENTS

| | | | |
|---|---|---|---|
| 2014/0211704 A1 | 7/2014 | Sampath et al. | |
| 2015/0023449 A1 | 1/2015 | Porat et al. | |
| 2015/0131624 A1 | 5/2015 | Merlin et al. | |
| 2015/0271137 A1 | 9/2015 | Seok | |
| 2016/0029373 A1* | 1/2016 | Seok | H04L 1/16 370/338 |
| 2016/0056930 A1* | 2/2016 | Seok | H04L 5/005 370/330 |
| 2016/0080973 A1 | 3/2016 | Tian et al. | |
| 2016/0113009 A1 | 4/2016 | Seok | |
| 2016/0165589 A1* | 6/2016 | Chu | H04W 4/06 370/329 |
| 2016/0242070 A1 | 8/2016 | Asterjadhi et al. | |
| 2016/0302229 A1* | 10/2016 | Hedayat | H04L 12/1868 |
| 2016/0315675 A1* | 10/2016 | Seok | H04B 7/0452 |
| 2016/0323861 A1 | 11/2016 | Cordeiro et al. | |
| 2017/0048048 A1* | 2/2017 | Seok | H04L 1/1621 |
| 2017/0208625 A1* | 7/2017 | Choi | H04W 74/006 |
| 2017/0366301 A1 | 12/2017 | Sun et al. | |
| 2018/0014216 A1 | 1/2018 | Banerjea et al. | |
| 2018/0310330 A1* | 10/2018 | Chun | H04W 72/0413 |
| 2019/0288892 A1 | 9/2019 | Son et al. | |

FOREIGN PATENT DOCUMENTS

| | | |
|---|---|---|
| KR | 10-2014-0048162 | 4/2014 |
| KR | 10-2015-0066605 | 6/2015 |
| WO | 2015/137618 | 9/2015 |

OTHER PUBLICATIONS

Written Opinion of the International Searching Authority for PCT/KR2017/012552 dated Mar. 13, 2018 and its English translation by Google Translate (now published as WO 2018/084689).
International Preliminary Report on Patentability (Chapter I) for PCT/KR2017/012552 dated May 7, 2019 and its English translation from WIPO (now published as WO 2018/084689).
Notice of Allowance dated Dec. 9, 2020 for U.S. Appl. No. 16/347,578 (now published as U.S. 2019/0288892).
Office Action dated Aug. 31, 2020 for U.S. Appl. No. 16/347,578 (now published as U.S. 2019/0288892).
Office Action dated Nov. 18, 2022 for Korean Patent Application No. 10-2019-7014189 and its English translation provided by Applicant's foreign counsel.
Notice of Allowance dated May 23, 2023 for Korean Patent Application No. 10-2019-7014189 and its English translation provided by Applicant's foreign counsel.
Office Action dated Dec. 18, 2023 for Korean Patent Application No. 10-2023-7028515 and its English translation provided by Applicant's foreign counsel.

* cited by examiner

METHOD FOR WIRELESS COMMUNICATION WITH WIRELESS COMMUNICATION TERMINAL FOR LONG DISTANCE TRANSMISSION AND WIRELESS COMMUNICATION TERMINAL USING SAME

CROSS-REFERENCE TO RELATED APPLICATIONS

This application is a continuation of U.S. patent application Ser. No. 16/347,578 filed on May 28, 2019, which is the U.S. National Stage of International Patent Application No. PCT/KR2017/012552 filed on Nov. 7, 2017, which claims the priority to Korean Patent Application No. 10-2016-0158297 filed in the Korean Intellectual Property Office on Nov. 25, 2016, and the benefit of U.S. Provisional Application No. 62/418,295 filed in the United States Patent and Trademark Office on Nov. 7, 2016, the entire contents of which are incorporated herein by reference.

TECHNICAL FIELD

The present invention relates to a wireless communication method with a wireless communication terminal for long distance transmission and a wireless communication terminal using the same.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Also, recently, in order to support the Internet of Things (IoT) environment, in other words, low-power long-range wireless LAN communication technology has been developed to incorporate wireless LAN communication functions in various objects around us.

As the number of long-range wireless LAN devices increases in addition to existing wireless LAN devices, it is necessary to use the determined channel efficiently. Therefore, required is a technology capable of efficiently using bandwidths by simultaneously transmitting data between a plurality of stations and APs.

DISCLOSURE

Technical Problem

An object of an embodiment of the present invention provides a wireless communication terminal and a wireless communication method for long distance transmission.

Technical Solution

According to an embodiment of the present invention, a base wireless communication terminal includes a transceiver; and a processor. The processor is configured to transmit a mixed Physical Layer Protocol Data Unit (PPDU) including both data for a Long Range (LR) wireless communication terminal and data for a non-LR wireless communication terminal to the LR wireless communication terminal and the non-LR wireless communication terminal using the transceiver. The LR PPDU including only the data for the LR wireless communication terminal has a narrower bandwidth than a bandwidth of the non-LR PPDU including only the data for the non-LR wireless communication terminal. In this case, the bandwidth of the LR PPDU is the bandwidth of the LR preamble that is a preamble for the LR wireless communication terminal, and the bandwidth of the non-LR PPDU is the bandwidth of the non-LR preamble that is the preamble for the non-LR wireless communication terminal.

The processor may be configured to transmit a training signal for the LR wireless communication terminal included in the mixed PPDU and a training signal for the non-LR wireless communication terminal included in the mixed PPDU as separate OFDM symbols using the transceiver.

The processor may be configured to start to transmit a training signal for the LR wireless communication terminal before starting to transmit the training signal for the non-LR wireless communication terminal.

The processor may be configured to signal the length of the signaling field of the mixed PPDU transmitted earlier than the training signal for the non-LR wireless communication terminal to be longer than the actual length of the signaling field.

The training signal may include a short training signal, which is a relatively short training signal, and a long training signal, which is a relatively long training signal. In this case, the processor may be configured to signal the length of the signaling field of the mixed PPDU as the sum of the length of the signaling field of the mixed PPDU and the short training signal for the LR wireless communication terminal.

The processor may be configured to transmit a short training signal for the non-LR wireless communication terminal as a long training signal for the LR wireless communication terminal.

The processor may be configured to start data field transmission for the LR wireless communication terminal included in the mixed PPDU regardless of a transmission start time point of a data field for the non-LR wireless communication terminal included in the mixed PPDU.

The processor may be configured to start data field transmission for the LR wireless communication terminal included in the mixed PPDU before a transmission start time point of a data field for the non-LR wireless communication terminal included in the mixed PPDU.

The processor may be configured to signal at least one of an uplink transmission format according to an uplink transmission type and an uplink transmission start time point according to the uplink transmission type using the trigger information included in the mixed PPDU. In this case, the uplink transmission type may indicate whether the LR wireless communication terminal and the non-LR wireless communication terminal divide a frequency band to perform uplink transmission at the same time.

According to an embodiment of the present invention, an operation method of a base wireless communication terminal includes: generating a mixed Physical Layer Protocol Data Unit (PPDU) including both data for a Long Range (LR) wireless communication terminal and data for a non-LR wireless communication terminal; and transmitting the mixed PPDU to the LR wireless communication terminal and the non-LR wireless communication terminal. In this case, the LR PPDU including only the data for the LR wireless communication terminal has a narrower bandwidth than a bandwidth of the non-LR PPDU including only the data for the non-LR wireless communication terminal. In this case, the bandwidth of the LR PPDU is the bandwidth of the LR preamble that is a preamble for the LR wireless communication terminal, and the bandwidth of the non-LR PPDU is the bandwidth of the non-LR preamble that is the preamble for the non-LR wireless communication terminal.

The transmitting the mixed PPDU to the LR wireless communication terminal and the non-LR wireless communication terminal may include transmitting a training signal for the LR wireless communication terminal included in the mixed PPDU and a training signal for the non-LR wireless communication terminal included in the mixed PPDU as separate OFDM symbols.

The transmitting the training signal for the LR wireless communication terminal included in the mixed PPDU and the training signal for the non-LR wireless communication terminal included in the mixed PPDU as the separate OFDM symbols may include starting to transmit a training signal for the LR wireless communication terminal before starting to transmit the training signal for the non-LR wireless communication terminal.

The generating the mixed PPDU may include setting the length of the signaling field of the mixed PPDU transmitted earlier than the training signal for the non-LR wireless communication terminal to be longer than the actual length of the signaling field.

The training signal may include a short training signal, which is a relatively short training signal, and a long training signal, which is a relatively long training signal. In this case, the setting the value for signaling the length of the signaling field to be longer than the actual length of the signaling field may include setting a value for signaling the length of the signaling field as the sum of the length of the signaling field of the mixed PPDU and the short training signal for the LR wireless communication terminal.

The transmitting the mixed PPDU to the LR wireless communication terminal and the non-LR wireless communication terminal may further include transmitting a short training signal for the non-LR wireless communication terminal as a long training signal for the LR wireless communication terminal.

The starting to transmit the training signal for the LR wireless communication terminal before starting to transmit the training signal for the non-LR wireless communication terminal may further include starting data field transmission for the LR wireless communication terminal included in the mixed PPDU regardless of a transmission start time point of a data field for the non-LR wireless communication terminal included in the mixed PPDU.

The starting the data field transmission for the LR wireless communication terminal may include starting data field transmission for the LR wireless communication terminal included in the mixed PPDU before a transmission start time point of a data field for the non-LR wireless communication terminal included in the mixed PPDU.

The generating the mixed PPDU may include inserting trigger information for signaling at least one of an uplink transmission format according to an uplink transmission type and an uplink transmission start time point according to the uplink transmission type into the mixed PPDU. In this case, the uplink transmission type may indicate whether the LR wireless communication terminal and the non-LR wireless communication terminal divide a frequency band and perform uplink transmission at the same time.

Advantageous Effects

An embodiment of the present invention provides a wireless communication method with a wireless communication terminal for long distance transmission and a wireless communication terminal using the same.

MODE FOR CARRYING OUT THE INVENTION

Figure 1:
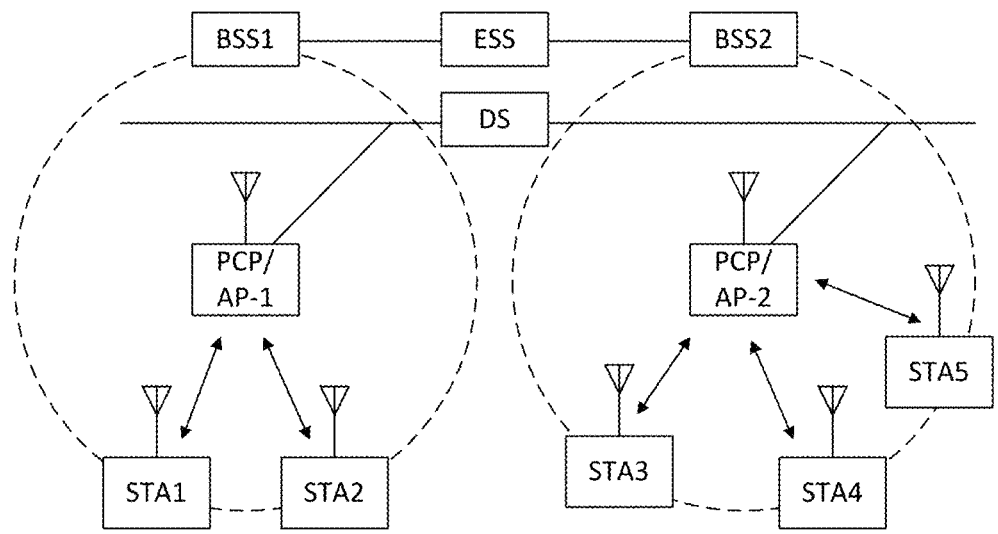
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0158297 (2016 Nov. 25) and United States Patent Application Nos. 62/418, 295 (2016 Nov. 7) and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
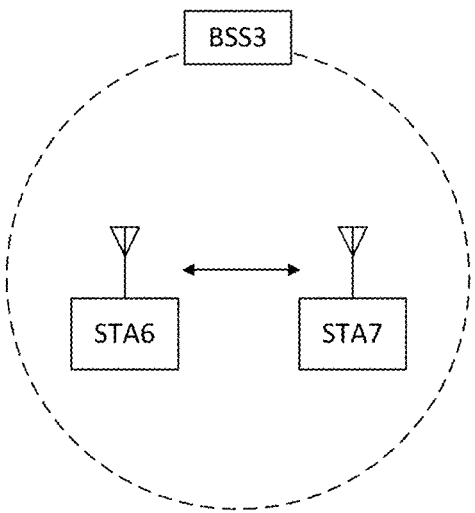
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
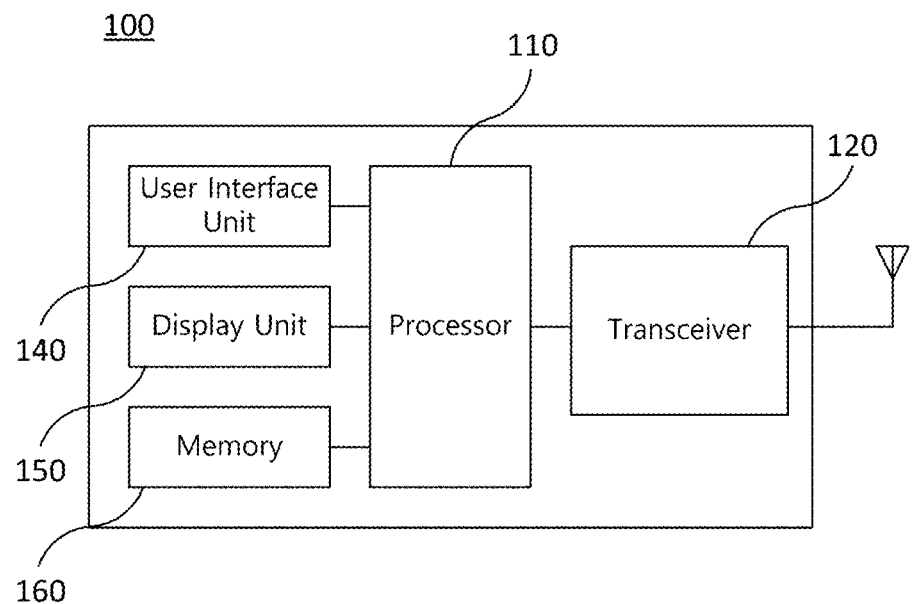
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
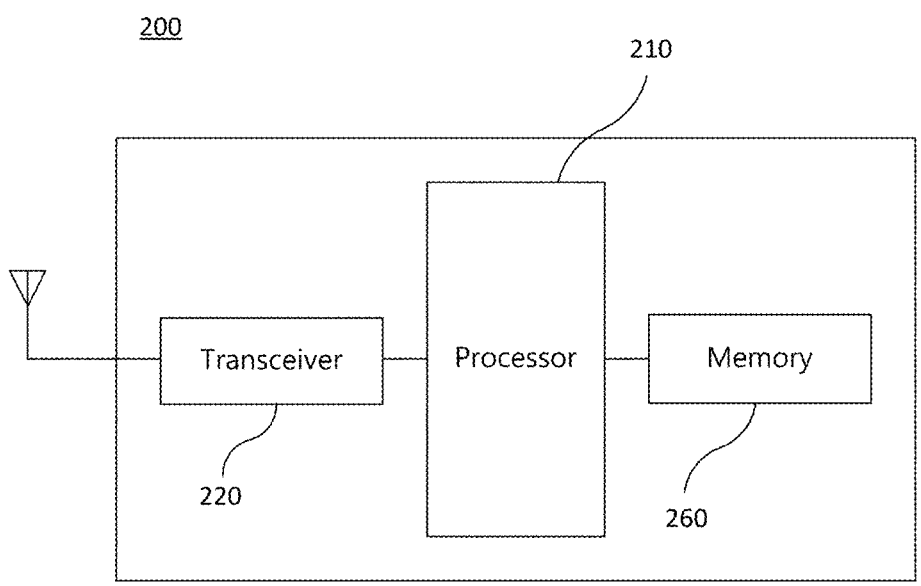
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
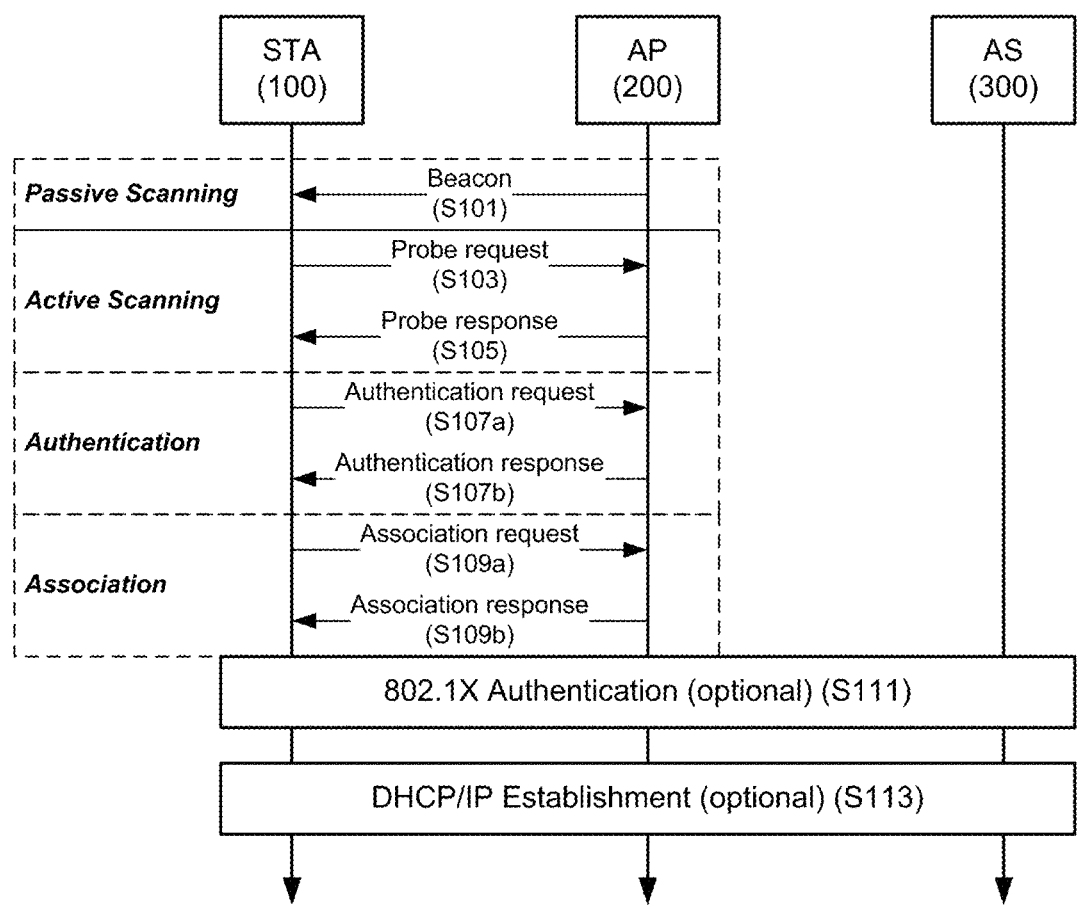
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The base wireless communication terminal may be a wireless communication terminal that allocates and schedules medium resources in communication with a plurality of wireless communication terminals. Specifically, the base wireless communication terminal may serve as a cell coordinator. In a specific embodiment, the base wireless communication terminal may be a wireless communication terminal that allocates and schedules communication medium resources in an independent network, such as an ad-hoc network, that is not connected to an external distribution service.

Figure 6:
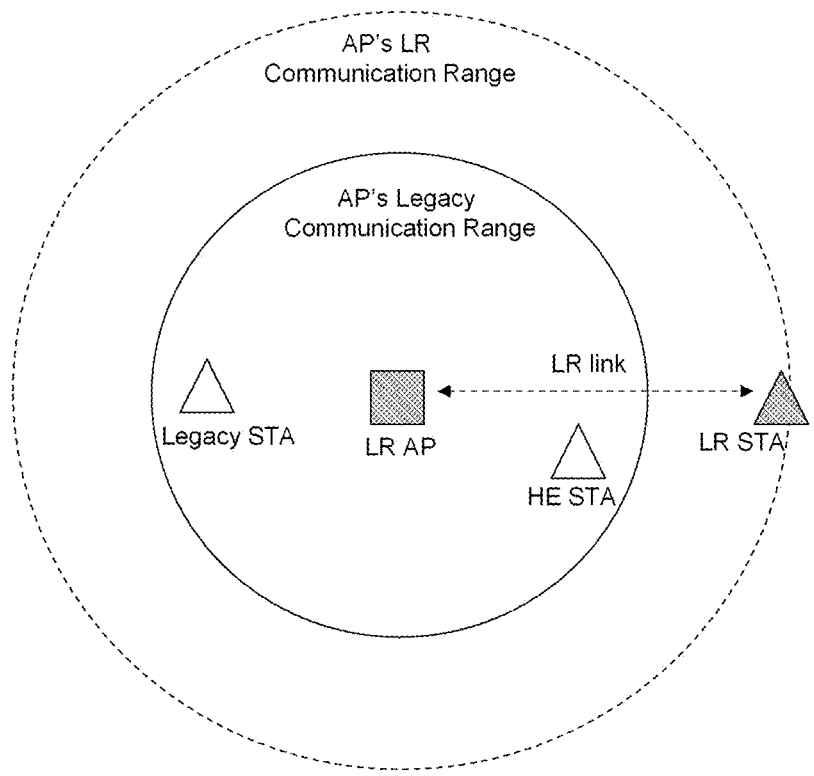
FIG. 6 shows a configuration of a wireless LAN network according to an embodiment of the present invention.

FIG. 6 shows a configuration of a wireless LAN network according to an embodiment of the present invention.

In the wireless LAN communication, the wireless communication terminal may perform long range (LR) communication. Specifically, the wireless communication terminal may transmit the second PPDU using a frequency bandwidth narrower than the frequency bandwidth used when the wireless communication terminal transmits the first physical layer protocol data unit (PPDU) in the wireless LAN frequency band. In this case, the frequency bandwidth may represent the frequency bandwidth of the preamble that is decodable only by the wireless communication terminal capable of receiving the PPDU. For example, if the first PPDU is an IEEE 802.11 ax standard-based PPDU, the preamble that is decodable only by the wireless communication terminal capable of receiving the PPDU is the HE-SIG-A field, and the bandwidth of the preamble that is decodable only by the wireless communication terminal capable of receiving the PPDU may be 20 MHz. That is, the bandwidth of the preamble that is decodable only by the wireless communication terminal capable of receiving the second PPDU may be narrower than 20 MHz. Therefore, the transmission range of the second PPDU may be larger than the transmission range of the first PPDU. Specifically, when the wireless communication terminal transmits the first PPDU and the second PPDU with the same transmission power, the transmission range of the second PPDU may be larger than the transmission range of the first PPDU. In this case, the wireless LAN frequency band may be a frequency band of 2.4 GHz or 5 GHz band used in the IEEE 802.11a/b/g/n/ac/ax standard. For convenience of explanation, the first PPDU may be referred to as a general PPDU, and the second PPDU may be referred to as an LR PPDU. A general PPDU may be a PPDU transmitted based on the IEEE 802.11a/b/g/n/ac standard. In addition, a general PPPDU may be a PPDU transmitted based on the IEEE 802.11ax standard.

The wireless communication terminals transmitting and receiving the LR PPDUs may operate in association with the base wireless communication terminals transmitting and receiving the LR PPDUs. Moreover, for convenience of explanation, the base wireless communication terminal transmitting and receiving the LR PPDU is referred to as an LR base wireless communication terminal. In addition, the LR base wireless communication terminal may transmit and receive the general PPDU as well as the LR PPDU.

In addition, a wireless communication terminal that does not receive the LR PPDU and receives the general PPDU is referred to as a non-LR wireless communication terminal. The non-LR wireless communication terminal may operate according to at least one of IEEE 802.11 a/b/g/n/ac/ax. The non-LR wireless communication terminal may transmit and receive a general PPDU using a frequency band of 20 MHz bandwidth or more. Specifically, the non-LR wireless communication terminal may transmit and receive PPDUs using at least one of frequency bands having bandwidths of 20 MHz, 40 MHz, 80 MHz, 160 MHz, and 80 MHz+80 MHz. In this case, the frequency band having a bandwidth of 80 MHz+80 MHz is not continuous but represents two frequency bands having an 80 MHz bandwidth. Specifically, the non-LR wireless communication terminal may use 64 FFT-based OFDM using 64 subcarriers in a frequency band having a bandwidth of 20 MHz. Also, the non-LR wireless communication terminal may use 256 FFT-based OFDM using 256 subcarriers in a frequency band having a bandwidth of 20 MHz. In addition, the non-LR wireless communication terminal may perform Orthogonal Frequency Division Multiple Access (OFDMA) based communication using 26 subcarriers, 52 subcarriers, or 102 subcarrier based resource units that are part of a frequency band having a 20 MHz bandwidth.

The non-LR wireless communication terminal may be classified into a legacy wireless communication terminal operating according to any one of IEEE 802.11 a/b/g/n/ac and an HE wireless communication terminal operating according to IEEE 802.11 ax. The general PPDU may include a legacy preamble that is decodable by both the legacy wireless communication terminal and the HE wireless communication terminal. Specifically, the legacy preamble may include L-STF, L-LTF, and L-SIG fields.

The LR wireless communication terminal that is not the base wireless communication terminal may not receive or transmit a general PPDU. Specifically, the LR wireless communication terminal that is not a base wireless communication terminal may use only a frequency band having a bandwidth narrower than a bandwidth used for transmission of a general PPDU. For example, an LR wireless communication terminal that is not a base wireless communication terminal may use a frequency band having a bandwidth of 2.5 MHz or 5 MHz. In this case, the LR wireless communication terminal may use 32 FFT-based OFDM using 32 subcarriers or 64 FFT-based OFDM using 64 subcarriers.

The LR wireless communication terminal that is the base wireless communication terminal may receive or transmit not only the LR PPDU but also the general PPDU. Specifically, the LR wireless communication terminal that is a base wireless communication terminal may use not only a frequency band having a bandwidth narrower than the minimum bandwidth used for transmission of a general PPDU but also a frequency band having a bandwidth used for transmission of a general PPDU. For example, the LR wireless communication terminal that is a base wireless communication terminal may use at least one of a frequency band having a bandwidth of 2.5 MHz or 5 MHz, as well as a frequency band having a bandwidth of 20 MHz, 40 MHz, 80 MHz, 160 MHz and 80 MHz+80 MHz. The LR wireless communication terminal that is a base wireless communication terminal may use 32 FFT-based OFDM using 32 subcarriers in a frequency band having a 2.5 MHz bandwidth. In addition, the LR wireless communication terminal that is a base wireless communication terminal may use 64 FFT-based OFDM using 64 subcarriers in a frequency band having a 5 MHz bandwidth. In addition, the LR wireless communication terminal that is the base wireless communication terminal may use a mixed PPDU for communicating with the LR wireless communication terminal and the non-LR wireless communication terminal through one PPDU. This will be described in detail with reference to FIGS. 10 to 12.

In addition, the LR PPDU may include a preamble for a non-LR wireless communication terminal. Through this, collision with the non-LR wireless communication terminal may be prevented, and transmission of the non-LR PPDU and transmission of the LR PPDU may coexist without collision.

In the embodiment of FIG. 6, an LR access point LR AP communicates with a non-LR station: Legacy STA and HE STA and an LR station LR STA. In this case, the LR access point LR AP may communicate with the LR station LR STA in a range wider than the range capable of communicating with the non-LR station: Legacy STA and HE STA. The PPDU format transmitted by the wireless communication terminal according to the embodiment of the present invention will be described in detail with reference to FIG. 7.

Figure 7:
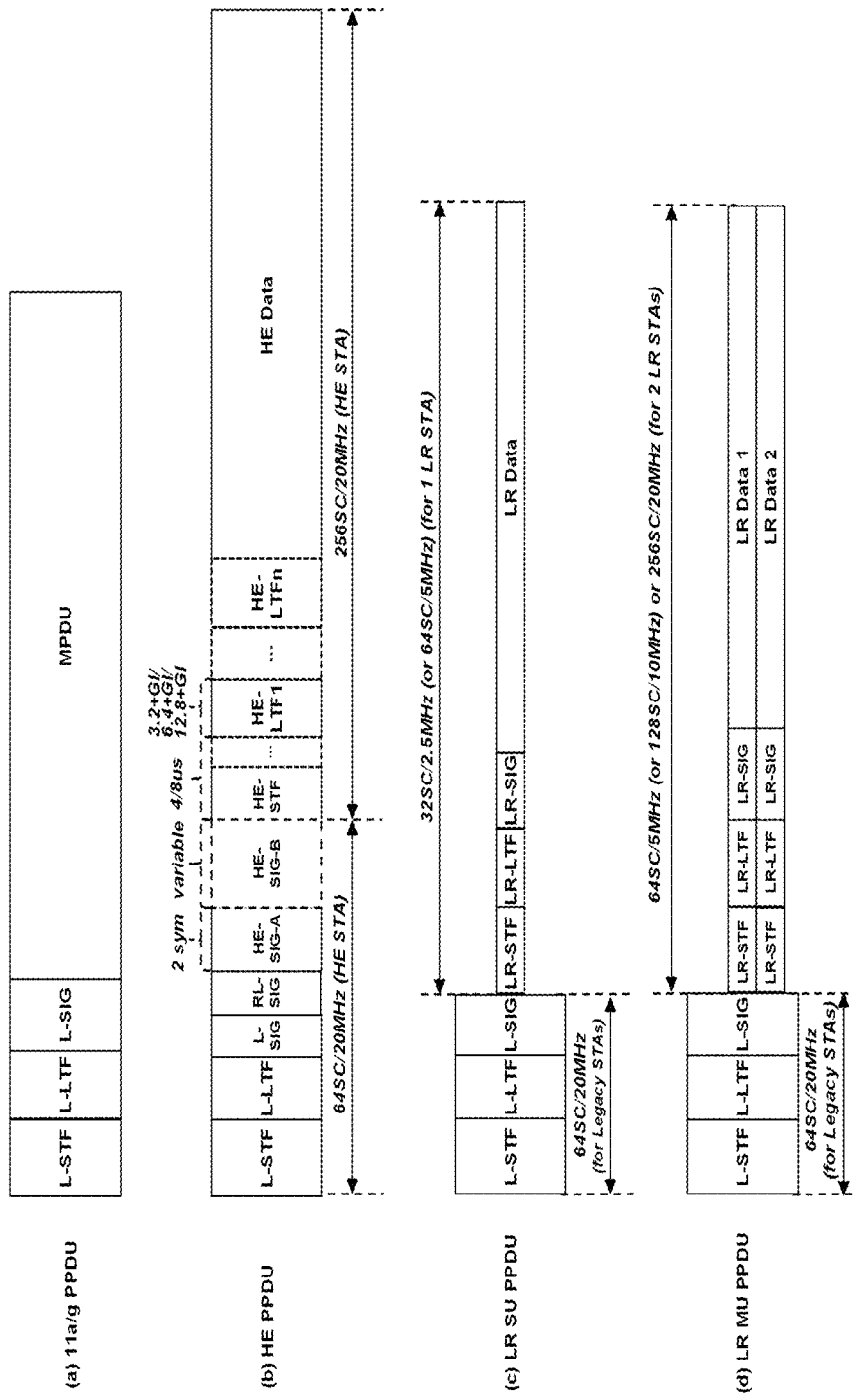
FIG. 7 shows a format of a PPDU used by a wireless communication terminal according to an embodiment of the present invention.

FIG. 7 shows a format of a PPDU used by a wireless communication terminal according to an embodiment of the present invention.

FIG. 7(a) shows the PPDU format according to the IEEE 802.11a/g standard. A PPDU according to the IEEE 802.11a/g standard includes an L-STF field, an L-LTF field, an L-SIG field, and a data field. The data field indicates data included in the PPDU. In this case, the data may be a MAC Protocol Data Unit (MPDU) format. The L-SIG field signals information that the legacy wireless communication terminal is capable of decoding. L-STF and L-LTF are training signals used for L-SIG field reception. The legacy wireless communication terminal may perform at least one of Automatic Gain Control (AGC), Time Synchronization (TS), and Frequency Offset Detection (FOD) based on L-STF and L-LTF. The legacy wireless communication terminal may determine the length of the PPDU based on the L-SIG. Further, the legacy wireless communication terminal receives data based on information signaled by the L-SIG field.

FIG. 7(b) shows the PPDU format according to the IEEE 802.11ax standard. The PPDU according to the IEEE 802.11ax standard includes an L-STF field, an L-LTF field, an L-SIG field, an RL-SIG field, a HE-SIG-A field, a HE-Data field. In this case, the L-STF field, the L-LTF field, and the L-SIG field are the same as those described with reference to FIG. 7(a). The RL-SIG field indicates that the corresponding PPDU is an HE PPDU in the form in which the L-SIG field is repeated. The HE-SIG-A and HE-SIG-B fields signal information on the configuration of the HE PPDU. The HE-SIG-A field contains information for decoding the HE PPDU. Specifically, when the PPDU includes the HE-SIG-B field, the HE-SIG-A field includes a length of the HE-SIG-B field and information on Modulation & Coding Scheme (MCS) of the HE-SIG-B field. In addition, the HE-SIG-A field may include an indicator indicating whether the transmission of the PPDU corresponds to the downlink transmission or the uplink transmission. In addition, the HE-SIG-A field may include information for identifying the BSS color to which the wireless communication terminal that transmitted the PPDU belongs. The number of symbols transmitting the HE-SIG-A field may be fixed. For example, the number of symbols for transmitting the HE-SIG-A field may be two.

If the PPDU including the HE-SIG-B field is a multi-user (MU) transmission, the HE-SIG-B field may signal resource allocation information for each user. In addition, the HE-SIG-B field may have a variable length. Specifically, the number of symbols transmitting the HE-SIG-B field may be variable.

HE-STF and HE-LTF are training signals for data field reception using 256 FFT-based OFDM. The wireless communication terminal may perform AGC and FOD in the 20 MHz band based on the HE-STF and the HE-LTF, and estimate a channel through which 256 subcarriers are transmitted. Also, the HE-LTF may be transmitted in a variable number according to the number of spatial streams. The HE-LTF may be divided into HE-LTF-1X, HE-LTF-2X and HE-LTF-4X depending on the application. The HE-LTF-1X/2X is used in indoor environment communication and has a duration of the sum of a 3.2 us/6.4 us signal and an additional guard interval, and the HE-LTF-4X is used for outdoor communication and has a duration of the sum of a 12.8 us signal and an additional guard interval.

The data field indicates data included in the PPDU. In this case, the data may be in an Aggregate (A)-MAC Protocol Data Unit (MPDU) format.

FIG. 7(c) shows a format of an LR SU PPDU transmitted by an LR wireless communication terminal that is a base wireless communication terminal according to an embodiment of the present invention. In addition, FIG. 7(d) shows a format of an LR MU PPDU transmitted by an LR wireless communication terminal that is a base wireless communication terminal according to an embodiment of the present invention.

The LR PPDU may include at least one of an L-STF field, an L-LTF field, an L-SIG field, an LR-STF field, an LR-LTF field and an LR-SIG field. In this case, the L-STF field, the L-LTF field, and the L-SIG field may perform the same functions as those described with reference to 7(a). Specifically, the non-LR wireless communication terminal may determine the length of the LR PPDU based on the L-SIG field. In this case, the non-LR wireless communication terminal may not attempt transmission in the frequency band in which the LR PPDU is transmitted during the length of the LR PPDU. The LR-STF and LR-LTF are training signals used to receive the LR-SIG field. The LR wireless communication terminal may perform AGC, TS, and FOD using the LR-STF and the LR-LTF, and estimate the channel through which the LR-SIG and the data field are transmitted. Also, the LR-LTF may be transmitted in a variable number according to the number of spatial streams. The LR-SIG field includes information for decoding the LR PPDU. Specifically, the LR-SIG field may include at least one of information on a Modulation & Coding Scheme (MCS) of LR Data, an indicator indicating whether the transmission of the PPDU corresponds to a downlink transmission or an uplink transmission, and BSS color information that identifies the BSS to which the wireless communication terminal that transmitted the PPDU belongs. The LR wireless communication terminal may receive the LR data field based on the LR-SIG field. The LR data field indicates data included in the LR PPDU. In this case, the data may be in A-MPDU format.

The LR wireless communication terminal transmitting the LR PPDU may change the OFDM modulation method according to the size of the frequency bandwidth allocated to the LR wireless communication terminal receiving the LR PPDU. Specifically, the LR wireless communication terminal transmitting the LR PPDU may change the number of subcarriers used for OFDM modulation according to the size of the frequency band allocated to the LR wireless communication terminal receiving the LR PPDU. In a specific embodiment, an LR wireless communication terminal transmitting an LR PPDU may transmit an LR PPDU using a predetermined number of subcarriers in a frequency band having a minimum unit bandwidth of the LR transmission. If a frequency band having a bandwidth having a multiple of a minimum unit bandwidth is allocated to a wireless communication terminal receiving an LR PPDU, the LR wireless communication terminal transmitting the LR PPDU may transmit the LR PPDU using a predetermined number of subcarriers. For example, an LR wireless communication terminal transmitting an LR PPDU may transmit an LR PPDU using 32 FFT-based OFDM in a frequency band having a 2.5 MHz bandwidth. In this case, the LR wireless communication terminal may transmit the LR PPDU based on 32 subcarriers. When a 5 MHz frequency band is allocated to any one of the LR wireless communication terminals, an LR wireless communication terminal transmitting an LR PPDU may transmit an LR PPDU based on 64 subcarriers. In this case, the LR wireless communication terminal transmitting the LR PPDU may transmit the LR PPDU using the 64 FFT-based OFDM.

The LR wireless communication terminals transmitting LR PPDUs may transmit L-STF, L-LTF, and L-SIG fields using 64 FFT-based OFDM in a frequency band having a bandwidth of 20 MHz. In addition, the LR wireless communication terminal transmitting the LR PPDU may transmit LR-STF, LR-LTF, LR-SIG field, and LR data field using 256 FFT-based OFDM in a frequency band having a bandwidth of 20 MHz. Specifically, the LR wireless communication terminal transmitting the LR PPDU nulls subcarriers of a frequency band not occupied by the LR-STF, LR-LTF, LR-SIG, and LR data fields, and transmits LR-STF, LR-LTF, LR-SIG and LR data fields by performing an inverse FFT. In this embodiment, the LR wireless communication terminal transmitting the LR PPDU may have an advantage that it does not need to support various kinds of FFT configurations other than the OFDM transmission of 64 FFT and 256 FFT configurations.

The LR wireless communication terminal receiving the LR PPDU may not receive the L-STF, L-LTF, and L-SIG that the non-LR wireless communication terminal may receive. This is because the LR wireless communication terminal that is not the base wireless communication terminal may only receive the LR PPDU in the frequency band of the bandwidth in which the LR data field may be transmitted. In this case, the LR wireless communication terminal receiving the LR PPDU may receive the LR data field from the Resource Unit (RU) agreed with the wireless communication terminal transmitting the LR PPDU. Further, when the LR PPDU is an LR Multi User (MU) PPDU including data transmitted simultaneously to a plurality of LR wireless communication terminals, the LR wireless communication terminal that is the base wireless communication terminal may transmit the LR data field through each of the plurality of RUs allocated to each of the plurality of LR wireless communication terminals. In this case, each of the plurality of RUs may be agreed between a plurality of LR wireless communication terminals and an LR wireless communication terminal that is a base wireless communication terminal. Specifically, the LR wireless communication terminal that is the base wireless communication terminal may transmit the LR MU PPDU as shown in FIG. 7(d) to a plurality of LR wireless communication terminals.

The format of a training signal transmitted by a wireless communication terminal according to an embodiment of the present invention will be described with reference to FIGS. 8 to 9.

Figure 8:
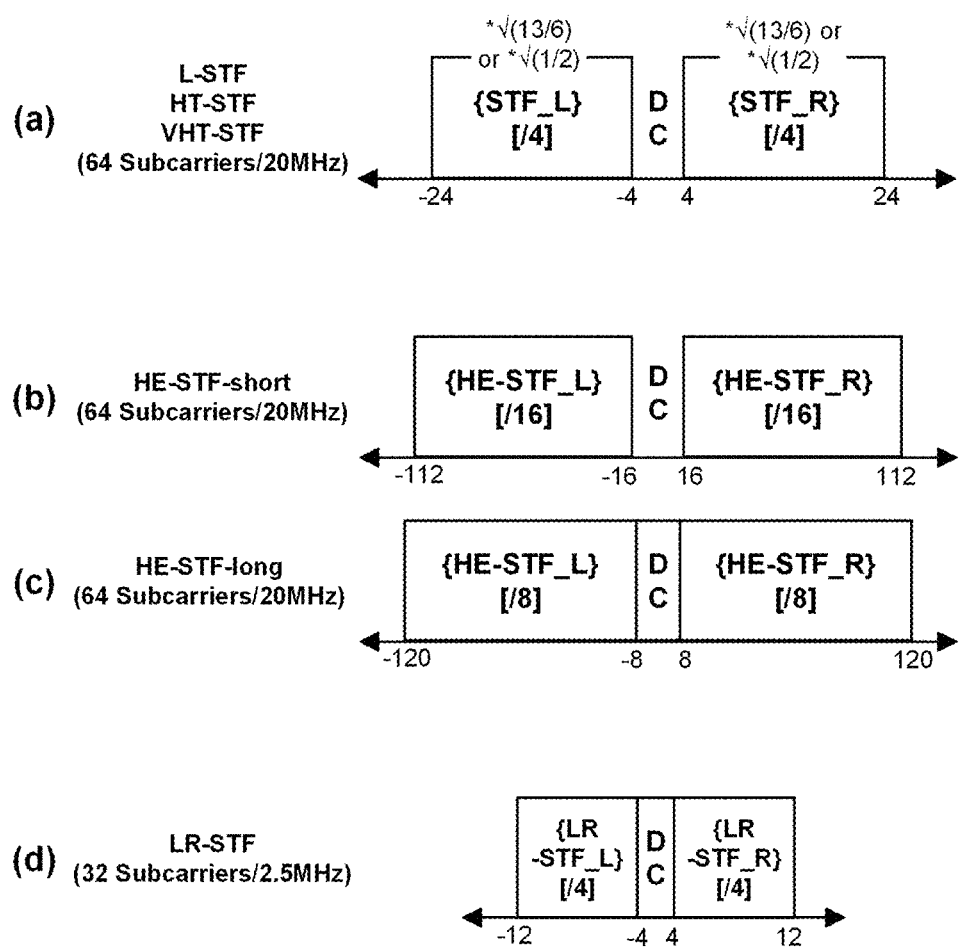
FIG. 8 shows a short training field signal transmitted from a wireless communication terminal according to an embodiment of the present invention.

FIG. 8 shows a short training field signal transmitted from a wireless communication terminal according to an embodiment of the present invention.

When a wireless communication terminal transmits a 64FTFT-based short training signal in a frequency band having a bandwidth of 20 MHz, the short training signal includes 64 subcarriers. In this case, the interval between the subcarriers is 312.5 KHz. In addition, the six subcarriers having the smallest subcarrier index and the five subcarriers having the largest subcarrier index are located in the guard band. For convenience of explanation, the subcarriers located at the indexes −a to b of the subcarriers are denoted by (−a, b), and the square root thereof is denoted by sqrt.

Accordingly, the shot training signal in FIG. 8(a) may be expressed by (−26, 26). The subcarriers included in the short training signal have the following values.

{L-STF_(−26,26)}=(sqrt(13/6) or sqrt(½))*{0,0,1+j, 0,0,0,−1−j,0,0,0,1+j,0,0,0,−1−j,0,0,0,−1−j,0,0,0, 1+j,0,0,0,0,0,0,0,−1−j,0,0,0,−1−j,0,0,0,1+j,0,0,0, 1+j,0,0,0,1+j,0,0,0,1+j,0,0}

In the embodiment of FIG. 8(a), the wireless communication terminal transmits a non-zero short training signal through 12 subcarriers. In this case, the wireless communication terminal transmits 12 subcarriers with a value of 1+j or −1−j. Further, the wireless communication terminal multiplies the subcarriers by a scaling value for adjusting the size of the short training signal. Specifically, the wireless communication terminal may multiply the scaling value and transmit a short training signal having the same size as the long training signal.

In order to describe the short training signal transmitted over a bandwidth greater than 20 MHz, the pattern of the short training signal described with reference to FIG. 8(a) is indicated by STF_L on the left side of the DC band, and the pattern on the right side is indicated by STF_R. Specifically, STF_L and STF_R represent the following signal patterns.

{STF_L}={1+j,0,0,0,−1−j,0,0,0,1+j,0,0,0,−1−j,0,0,0,− 1−j,0,0,0,1+j}

{STF_R}={−1−j,0,0,0,−1−j,0,0,0,1+j,0,0,0,1+j,0,0,0, 1+j,0,0,0,1+j}

Also, for convenience of explanation, allocating 0 to continuous n subcarriers is indicated by {0xn}. Accordingly, the short training signals of FIG. 8(a) may be expressed as follows.

{L-STF_(−26,26)}=( )*{0,0,{STF_L},{0X7}, {STF_R},0,0}

FIGS. 8(b) and 8(c) show a pattern of a short training signal transmitted by a HE wireless communication terminal in a frequency band having a bandwidth of 20 MHz. FIG. 8(b) shows HE-STF-short, and FIG. 8(c) shows HE-STF-long. In the 20 MHz frequency band, the wireless communication terminal transmits the HE-STF using 256 FFTs. In this case, the wireless communication terminal may set the interval of subcarriers for transmitting the short training signal to 16 to generate an HE-STF-short with 16 repeated signals during an OFDM symbol with a duration of 12.8 us. Therefore, the basic unit length of the training signal of the HE-STF-short in the time domain is 0.8 us, and the training signal of the HE-STF-short may have a length of 4 us obtained by sampling 5 corresponding basic signals.

The wireless communication terminal sets the interval of subcarriers for transmitting the short training signal to 8 so that it may generate an HE-STF-long with 8 repeated signals during an OFDM symbol with a duration of 12.8 us. Therefore, the basic unit length of the short training signal of the HE-STF-long in the time domain is 1.6 us, and the training signal of the HE-STF-long may have a length of Bus obtained by sampling 5 corresponding basic signals.

FIG. 8 (d) shows a short training signal that a wireless communication terminal according to an embodiment of the present invention transmits on the basis of 32 FFT through a frequency band having a 2.5 MHz bandwidth.

{LR-STF_(−13,13)}={0,0.5*(1+j),0,0,0,−1−j,0,0,0,1+ j,0,0,0,0,0,0,0,−1−j,0,0,0,−1−j,0,0,0,0.5*(−1−j), 0}

In this case, the pattern of the short training signal may represent the left pattern as LR-STF_L and the right pattern as LR-STF_R based on the DC band. LR-STF_L and LR-STF_R may be indicated by the following signal patterns.

{LR-STF_L}={0.5*(1+j),0,0,0,−1−j,0,0,0,1+j}

{LR-STF_R}={−1−j,0,0,0,−1−j,0,0,0,0.5*(−1−j)}

Using the LR-STF_L and LR-STF_R, the short training signal of FIG. 9(d) may be expressed as follows.

{LR-STF_(−13,13)}={0,{S-STF_L},{0X7},{S-STF_R},0}

Figures 9, 10:
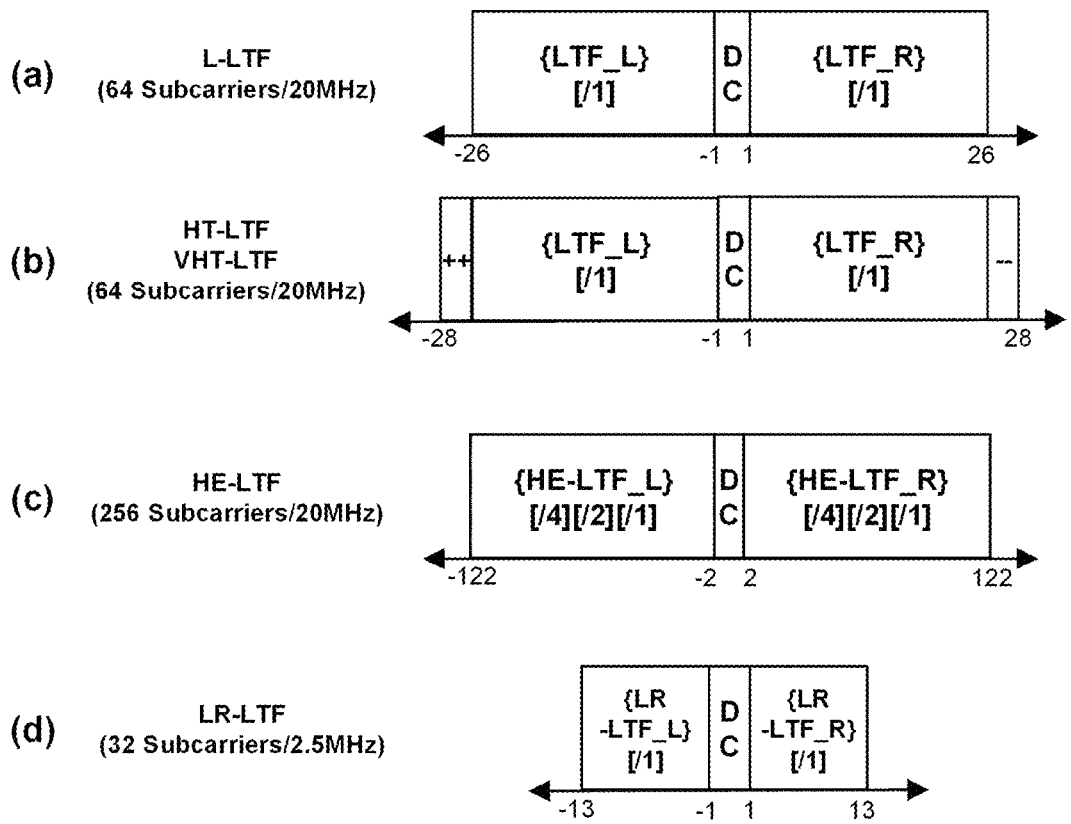
FIG. 9 shows a long training field signal transmitted from a wireless communication terminal according to an embodiment of the present invention.
FIG. 10 shows a format of a mixed PPDU used by a wireless communication terminal according to an embodiment of the present invention.

FIG. 9 shows a long training field signal transmitted from a wireless communication terminal according to an embodiment of the present invention.

FIG. 9(a) shows a subcarrier signal pattern included in an L-LTF transmitted by a wireless communication terminal using a 64 FFT according to an embodiment of the present invention. When the wireless communication terminal transmits L-LTF using 64 FFT, the wireless communication terminal transmits L-LTF using 64 subcarriers in a frequency band having a bandwidth of 20 MHz. In this case, the interval between the subcarriers is 312.5 KHz. Six subcarriers having the lowest subcarrier index among the 64 subcarriers and five subcarriers having the largest subcarrier index are located in the guard band. Therefore, the wireless communication terminal may transmit data through the 26 left and 26 right subcarriers of the DC band reference excluding the subcarriers located in the guard band.

The signal pattern of a subcarrier included in L-LTF is as follows. {L-LTF_(−26,26)}={1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1}

The wireless communication terminal transmits a signal modulated by binary phase shift keying (BPSK) through 52 subcarriers. In this case, {LTF_L} and {LTF_R} patterns may be defined as follows, based on the DC band of a frequency center part.

{LTF_L}={1,1,−1,−1,1,1,−1,1,−1,1,1,1,1,1,1,−1,−1,1, 1,−1,1,−1,1,1,1,1}

{LTF_R}={1,−1,−1,1,1,−1,1,−1,1,1,−1,−1,−1,−1,−1,1,1, 1,−1,−1,1,1,−1,1,1,1,1}

If the {LTF_L} pattern and the {LTF_R} pattern are used, the signal pattern of a subcarrier included in L-LTF may be simply represented as {L-LTF_(−26,26)}={{LTF_L}, 0, {LTF_R}}.

FIG. 9(b) shows a subcarrier signal pattern included in an HT/VHT-LTF transmitted by a wireless communication terminal using a 64 FFT according to an embodiment of the present invention. When the wireless communication terminal transmits HT/VHT-LTF using 64 FFT, HT/VHT-LTF includes 64 subcarriers in the 20 MHz band. The interval between the subcarriers is 312.5 KHz. Among the 64 subcarriers, four subcarriers having the smallest subcarrier index and three subcarriers having the largest subcarrier index are located in the guard band. The wireless communication terminal may transmit data through the 28 left and 28 right subcarriers of the DC band reference excluding the subcarriers located in the guard band.

{HT/VHT-LTF_(−28,28)}={1,1,1,1,−1,−1,1,1,−1,1,− 1,1,1,1,1,1,1,1,−1,−1,1,1,−1,1,−1,1,1,1,1,1,0,1,−1,−1, 1,1,−1,1,−1,1,−1,−1,−1,−1,−1,1,1,−1,−1,1,−1,1,−1,1,1,1,− 1,1,1,1,1,−1,−1}

HT/VHT-LTF is obtained by allocating values of {1, 1} and {−1, 1} to each of subcarriers located at {−28, −27} and {27, 28} of the signal pattern of a subcarrier included in the L-LTF described above. If the {LTF_L} pattern and {LTF_R} pattern are used, they may be simply represented as {HT/VHT-LTF_(−28,28)}={1, 1, {LTF_L}, 0, {LTF_R}, −1, −1}.

FIG. 9 (c) shows a signal pattern of a subcarrier included in an HE-LTF signal transmitted by the HE wireless communication terminal using 256 FFT in a 20 MHz bandwidth according to an embodiment of the present invention.

LTF is divided into HE-LTF-1X/2X/4X depending on whether it is an LTF that transmits a signal to only one subcarrier per four of the subcarriers included in the LTF, whether it is an LTF that transmits signals to even-numbered subcarriers only, or whether it is an LTF that transmits signals to all subcarriers. When the wireless communication terminal uses the HE-LTF-1X, the wireless communication terminal may be reduced to ¼ of the length of the LTF as compared to using the HE-LTF-4X. When the wireless communication terminal uses the HE-LTF-2X, the wireless communication terminal may be reduced to ½ of the length of the LTF as compared to using the HE-LTF-4X. When the wireless communication terminal uses the HE-LTF-1X or the HE-LTF-2X, the channel estimation performance is lower than when using the HE-LTF-4X. Therefore, the wireless communication terminal may selectively use HE-LTF-1X, HE-LTF-2X and HE-LTF-4X depending on the communication environment. Specifically, the wireless communication terminal may use HE-LTF-1X or HE-LTF-2X in indoor and HE-LTF-4X in outdoor.

FIG. 9(d) shows a signal pattern of a subcarrier included in the LR-LTF transmitted by the wireless communication terminal using the 32 FFT in the 2.5 MHz bandwidth according to an embodiment of the present invention. Specifically, LR-LTF is as follows.

{LR-*LTF*_(−13,13)}={1,−1,1,−1,−1,1,−1,1,1,−1,1,1,1, 0,−1,−1,−1,1,−1,−1,1,1,−1,1,1,1,−1}

In this case, {LR-LTF_L} pattern and {LR-LTF_R} pattern may be defined based on the DC band of a frequency center part.

{LR-*LTF_L*}={1,−1,1,−1,−1,1,−1,1,1,−1,1,1,1}

{LR-*LTF_R*}={−1,−1,−1,1,−1,−1,1,1,−1,1,1,1,−1}

Using the {LR-LTF_L} and {LR-LTF_R} patterns, the long training signal in FIG. 10(d) may be expressed as {LR-LTF_(−13,13)}={(LR-LTF_L), 0, {LR-LTF_R}}.

The base wireless communication terminal may transmit a PPDU that simultaneously transmits data to the LR wireless communication terminal and the non-LR wireless communication terminal. Specifically, when the LR wireless communication terminal is located close to the base wireless communication terminal, the base wireless communication terminal may transmit a PPDU that simultaneously transmits data to the LR wireless communication terminal and the non-LR wireless communication terminal. When the LR wireless communication terminal is located nearby, this is because the base wireless communication terminal may transmit the PPDU to the LR wireless communication terminal without concentrating the transmission power on a narrow bandwidth and transmitting the PPDU. Further, when the LR wireless communication terminal and the non-LR wireless communication terminal coexist, the base wireless communication terminal may increase the frequency band use efficiency. For your convenience, among the PPDUs transmitted by the base wireless communication terminal, a PPDU including both data for the LR wireless communication terminal and the non-LR wireless communication terminal is referred to as a mixed PPDU. The specific format of the mixed PPDU will be described with reference to FIGS. 10 to 11.

FIG. 10 shows a format of a mixed PPDU used by a wireless communication terminal according to an embodiment of the present invention.

FIG. 10(a) shows a MU Downlink (DL) mixed PPDU format transmitted by a wireless communication terminal according to an embodiment of the present invention. The base wireless communication terminal may simultaneously transmit data to the LR wireless communication terminal and the non-LR wireless communication terminal using the mixed PPDU. The mixed PPDU for multi user downlink transmission (MU DL) includes a non-LR preamble that is a preamble for the non-LR wireless communication terminal and an LR preamble DL LR preamble that is a preamble for the LR wireless communication terminal, and a non-LR data field DL HE Data that is data for a non-LR wireless communication terminal and an LR data field DL LR Data that is data for an LR wireless communication terminal. In this case, the non-LR preamble may include a legacy preamble for a legacy wireless communication terminal, a non-legacy signaling field HE SIG-A/B that is a signaling field for a HE wireless communication terminal, and a non-legacy training signal DL HE Preamble that is a training signal for the HE wireless communication terminal. Also, the LR preamble may include an LR training signal for the LR wireless communication terminal and an LR signaling field for the LR wireless communication terminal.

The base wireless communication terminal may set the legacy signaling field to indicate the length of the mixed PPDU. Specifically, the base wireless communication terminal may set the L_RATE field and the L_LENGTH field of the legacy signaling field to indicate the length of the mixed PPDU. Also, the base wireless communication terminal may transmit legacy preamble and non-legacy signaling fields using 20 MHz bandwidth/64 FFT-based OFDM. The base wireless communication terminal may transmit the non-legacy training signal, the non-LR data field, the LR preamble, and the LR data field using 20 MHz bandwidth/ 256 FFT-based OFDM.

The base wireless communication terminal divides the frequency band in which the mixed PPDU is transmitted and may simultaneously transmits the non-legacy training signal and the non-LR data field DL HE Data, and the LR preamble DL LR Preamble and the LR data field DL LR Data through the divided frequency bands. The LR wireless communication terminal receiving the mixed PPDU may obtain the data represented by the LR data field from the mixed PPDU. Specifically, the LR wireless communication terminal receiving the mixed PPDU may receive the LR data based on the LR preamble. In a specific embodiment, the LR wireless communication terminal receiving the mixed PPDU may receive the LR signaling field based on the LR training signal. As described with reference to FIGS. 8 to 9, the LR wireless communication terminal may estimate a channel through which the PPDU is transmitted by performing at least one of AGC, TS, and FOD based on the LR training signal. The LR wireless communication terminal may receive the LR signaling field based on the estimated channel. Also, the LR wireless communication terminal may receive the LR data field based on the LR signaling field.

The non-LR wireless communication terminal receiving the mixed PPDU may obtain the data indicated by the non-LR data field DL HE Data from the mixed PPDU. Specifically, the HE wireless communication terminal may obtain data indicated by the non-LR data field DL HE Data from the mixed PPDU. In a specific embodiment, the HE wireless communication terminal may receive a non-legacy data field based on a non-legacy signaling field HE SIG-AB and a non-legacy training signal.

FIG. 10(b) shows a MU Uplink (UL) mixed PPDU format transmitted by a wireless communication terminal according to an embodiment of the present invention. The LR wireless communication terminal and the non-LR wireless communication terminal may simultaneously transmit data to the base wireless communication terminal using the mixed PPDU. Specifically, the LR wireless communication terminal and the non-LR wireless communication terminal may simultaneously transmit data to the base wireless communication terminal through the frequency band allocated to each of the LR wireless communication terminal and the non-LR wireless communication terminal. The mixed PPDU for multi user uplink transmission (MU UL) includes a non-LR preamble that is a preamble for the non-LR wireless communication terminal and an LR preamble UL LR preamble that is a preamble for the LR wireless communication terminal, and a non-LR data field UL HE Data that is data for a non-LR wireless communication terminal and an LR data field UL LR Data that is data for an LR wireless communication terminal. In this case, the non-LR preamble may include a legacy preamble for a legacy wireless communication terminal, a non-legacy signaling field HE SIG-A/B that is a signaling field for a HE wireless communication terminal, and a non-legacy training signal UL HE Preamble that is a training signal for the HE wireless communication terminal. Also, the LR preamble may include an LR training signal for the LR wireless communication terminal and an LR signaling field for the LR wireless communication terminal.

The non-LR wireless communication terminal may transmit the non-LR preamble and the non-LR data field. The non-LR wireless communication terminal may set the legacy signaling field to indicate the length of the mixed PPDU. Specifically, the non-LR wireless communication terminal may set the L_RATE field and the L_LENGTH field of the legacy signaling field to indicate the length of the mixed PPDU. Also, the non-NR wireless communication terminal may transmit legacy preamble and non-legacy signaling fields using 20 MHz bandwidth/64 FFT-based OFDM. The non-LR wireless communication terminal may transmit non-legacy training signals and non-LR data fields using 20 MHz bandwidth/256 FFT-based OFDM.

Also, the LR wireless communication terminal may transmit the LR preamble UL LR Preamble and the LR data field UL LR Data without transmitting the non-LR preamble. Specifically, the LR wireless communication terminal may transmit the LR preamble and the LR data field using a 20 MHz bandwidth/256 FFT-based OFDM.

After a predetermined time from the time point that the LR wireless communication terminal receives the trigger triggering the UL MU mixed PPDU from the base wireless communication terminal, the LR wireless communication terminal may transmit the LR preamble and the LR data field. In this case, the predetermined time may be the sum of the duration of the short inter-frame space (SIFS), the legacy preamble, and the non-legacy signaling field. The base wireless communication terminal may signal at least one of the uplink transmission start time point and the uplink transmission format of the LR wireless communication terminal according to the uplink transmission type using the trigger information included in the mixed PPDU. The LR wireless communication terminal may obtain information on at least one of a transmission time point and a transmission format from a trigger received from the base wireless communication terminal and may start uplink transmission according to at least one of the obtained transmission time point and transmission format. In this case, the uplink transmission type may indicate whether the LR wireless communication terminal and the non-LR wireless communication terminal divide the frequency band and perform uplink transmission simultaneously. Specifically, based on a trigger frame, the LR wireless communication terminal may determine whether to start the uplink transmission after it elapses by SIFS from the time point that the LR wireless communication terminal receives a trigger frame or whether to start the uplink transmission after it elapses by the duration sum of the SIFS, the legacy preamble, and the non-legacy signaling field from the time point that the trigger frame is received. In the above-described embodiment, SIFS may be replaced with another inter-frame interval defined by the IEEE 802.11 standard such as XIFS.

The base wireless communication terminal may transmit data for the LR wireless communication terminal and data for the non-LR wireless communication terminal together through these embodiments. Also, the LR wireless communication terminal and the non-LR wireless communication terminal may simultaneously receive data from the base wireless communication terminal.

Figure 11:
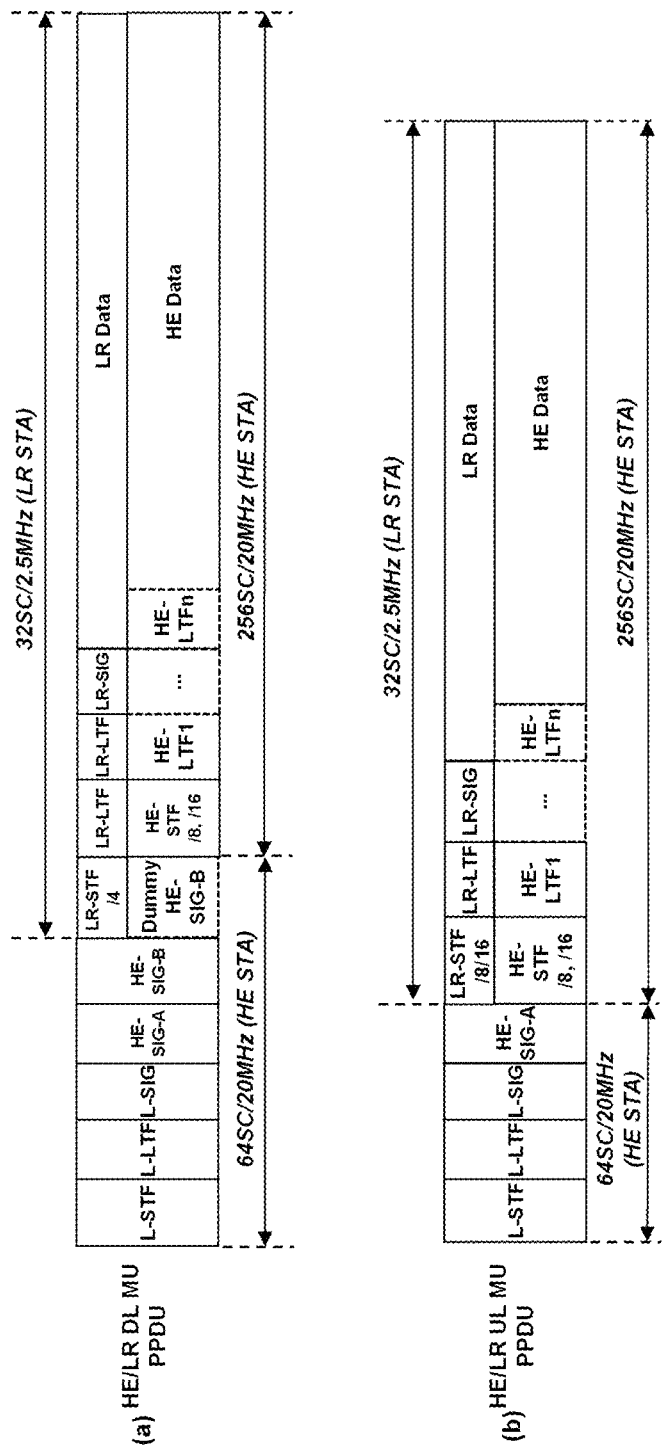
FIG. 11 shows a format of a mixed PPDU used by a wireless communication terminal according to an embodiment of the present invention in detail.

FIG. 11 shows a format of a mixed PPDU used by a wireless communication terminal according to an embodiment of the present invention in detail.

FIG. 11(a) shows a MU Downlink (DL) mixed PPDU format transmitted by a wireless communication terminal according to an embodiment of the present invention in detail. In a specific embodiment, when the base wireless communication terminal transmits a non-LR short training signal that is a short training signal for a non-LR wireless communication terminal, the base wireless communication terminal may transmit one training signal for each of 8 subcarriers or 16 subcarriers in 256 subcarriers. When the base wireless communication terminal transmits the LR short training signal, which is a short training signal for the LR wireless communication terminal, in the same OFDM symbol as the OFDM symbol transmitting the non-LR short training signal, the base wireless communication terminal transmits one training signal for every eight or sixteen subcarriers in the 32 subcarriers allocated to the LR wireless communication terminal, thereby transmitting signals to only four or two subcarriers. Therefore, in this embodiment, the wireless communication terminal receiving the LR training signal may be difficult to generate a repetitive pattern for channel estimation since the number of subcarriers transmitting the LR training signal is small.

The base wireless communication terminal may transmit the training signal for the LR wireless communication terminal and the training signal for the non-LR wireless communication terminal as separate OFDM symbols. Specifically, the base wireless communication terminal may transmit the LR short training signal and the non-LR short training signal as separate symbols. In this case, the base wireless communication terminal may start to transmit the training signal for the LR wireless communication terminal before starting the transmission of the training signal for the non-LR wireless communication terminal.

Also, the base wireless communication terminal may signal the length of the non-legacy signaling field of the mixed PPDU transmitted before the training signal longer than the length of the actual non-legacy signaling field. In this case, the base wireless communication terminal may signal the length of the non-legacy signaling field as the length obtained by adding the LR short training signal to the length of the non-legacy signaling field. Specifically, the base wireless communication terminal may signal the length of the HE-SIG-B field longer than the length of the actual HE-SIG-B. Specifically, the base wireless communication terminal may signal the length of the HE-SIG-B field as the length obtained by adding the LR short training signal to the HE-SIG-B length. Since the non-LR wireless communication terminal verifies each sub-field of the HE-SIG-B field individually using the CRC value, even if the length of the HE-SIG-B field is signaled differently from the actual HE-SIG-B length, the non-LR wireless communication terminal is possible to successfully decode each sub-field of the HE-SIG-B field. In a specific embodiment, the LR wireless communication terminal may use the non-LR short training signal as the LR long training signal. This is because when the LR wireless communication terminal knows in advance the value of the non-LR short training signal corresponding to the RU allocated to the LR wireless communication terminal, it may be used for channel estimation.

In addition, the base wireless communication terminal may independently start the transmission of the LR long training signal and the LR data field regardless of the transmission start of the non-LR training signal and the non-LR data field.

In the embodiment of FIG. 11(a), the base wireless communication terminal transmits the legacy preambles L-STF, L-LTF, and L-SIG and then transmits the non-legacy signaling fields HE-SIG-A and HE-SIG-B. In this case, the base wireless communication terminal signals the length of the HE-SIG-B field by adding the length of the HE-SIG-B field and the length of the LR-STF that is the LR short training signal. After the base wireless communication terminal transmits the length of the HE-SIG-B field, the base wireless communication terminal transmits the LR short training signal LR-STF through the frequency band allocated to the LR wireless communication terminal. Then, the base wireless communication terminal transmits the LR long training signal LR-LTF, the LR signaling field LR-SIG and the LR data field LR Data through the frequency band allocated to the LR wireless communication terminal. In addition, the base wireless communication terminal transmits a non-LR short training signal HE-STF, a non-LR long training signal HE-LTF, and a non-LR data field HE Data through a frequency band allocated to a non-LR wireless communication terminal.

FIG. 11(b) shows a specific format of a MU Uplink (UL) mixed PPDU transmitted by a wireless communication terminal according to an embodiment of the present invention. As described above, the LR wireless communication terminal and the non-LR wireless communication terminal may simultaneously transmit data to the base wireless communication terminal using the mixed PPDU. Specifically, the LR wireless communication terminal and the non-LR wireless communication terminal may simultaneously transmit data to the base wireless communication terminal through the designated frequency band. In this case, the LR wireless communication terminal may start transmitting the LR training signal before the non-LR wireless communication terminal starts transmitting the non-LR training signal. Specifically, the LR wireless communication terminal may start transmitting the LR short training signal before the non-LR wireless communication terminal starts transmitting the non-LR short training signal. In addition, the LR wireless communication terminal may start transmitting the LR data field before the non-LR wireless communication terminal starts transmitting the non-LR data field.

In the embodiment of FIG. 11(b), the LR wireless communication terminal starts transmitting the LR data field LR Data before the non-LR wireless communication terminal starts transmitting the non-LR data field HE Data. Specifically, the LR wireless communication terminal starts to transmit the LR data field LR Data while the non-LR wireless communication terminal transmits the non-LR long training signal.

Even when the base wireless communication terminal simultaneously transmits data to the LR wireless communication terminal and the non-LR wireless communication terminal through these embodiments, the LR wireless communication terminal and the non-LR wireless communication terminal may estimate a channel to receive data. Also, even when the LR wireless communication terminal and the non-LR wireless communication terminal simultaneously transmit data to the base wireless communication terminal, the base wireless communication terminal may estimate each of the channels to receive non-LR data and LR data.

Figure 12:
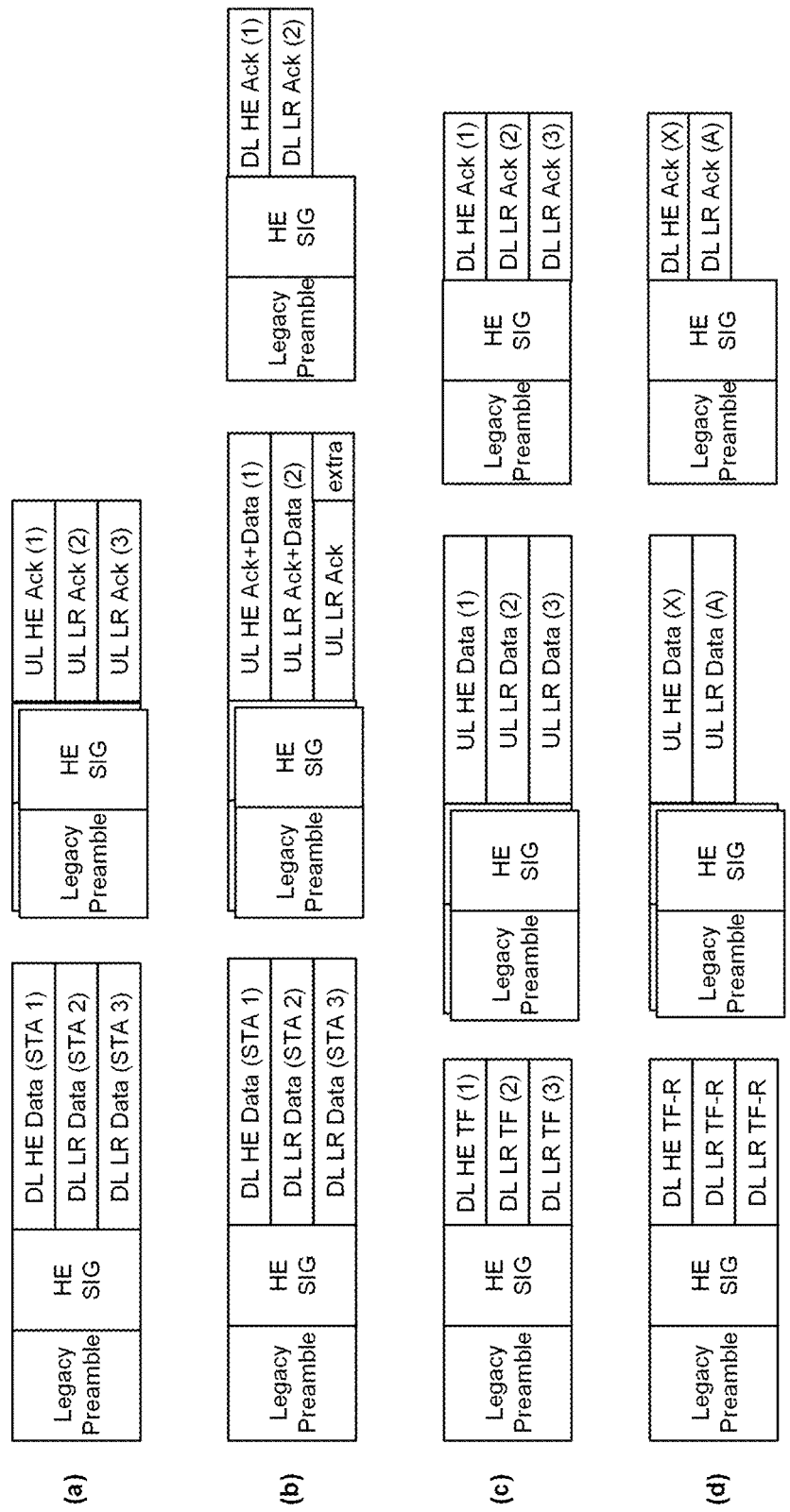
FIG. 12 shows a method of exchanging data and ACK by a wireless communication terminal according to an embodiment of the present invention.

FIG. 12 shows a method of exchanging data and ACK by a wireless communication terminal according to an embodiment of the present invention.

The LR wireless communication terminal and the non-LR wireless communication terminal, which receive the MU DL mixed PPDU from the base wireless communication terminal, may simultaneously transmit the ACK to the base wireless communication terminal using the MU UL mixed PPDU. In this case, the LR wireless communication terminal may transmit an ACK to the base wireless communication terminal through the frequency band in which the LR data field is received from the base wireless communication terminal. In this case, the LR wireless communication terminal may transmit an ACK to the base wireless communication terminal through the frequency band in which the LR data field is received from the base wireless communication terminal. Also, the LR wireless communication terminal and the non-LR wireless communication terminal may transmit the ACK using the MU UL mixed PPDU having the same length. Specifically, the LR wireless communication terminal and the non-LR wireless communication terminal may transmit the MU UL mixed PPDU using the same MCS. In a specific embodiment, the LR wireless communication terminal and the non-LR wireless communication terminal may transmit the MU UL mixed PPDU using the MCS indicated by the MU DL mixed PPDU. In another specific embodiment, the LR wireless communication terminal and the non-LR wireless communication terminal may transmit the MU UL mixed PPDU using the predetermined MCS.

In the embodiment of FIG. 12(a), the LR wireless communication terminal and the non-LR wireless communication terminal receive the DL MU mixed PPDU from the base wireless communication terminal. The LR wireless communication terminal and the non-LR wireless communication terminal transmit the UL MU mixed PPDU to the base wireless communication terminal. In this case, the LR wireless communication terminal transmits the LR data field to the base wireless communication terminal using the RU that received the LR data field. In addition, the LR wireless communication terminal and the non-LR wireless communication terminal transmit UL MU mixed PPDUs of the same length.

The LR wireless communication terminal may transmit data to the base wireless communication terminal while transmitting an ACK for the data received from the base wireless communication terminal. Specifically, the LR wireless communication terminal may transmit a PPDU including an ACK for data included in the DL PPDU to the base wireless communication terminal according to the length indicated by the base wireless communication terminal. The LR wireless communication terminal may insert the data into the PPDU including the ACK within the length indicated by the base wireless communication terminal and transmit the corresponding PPDU to the base wireless communication terminal. In another specific embodiment, the LR wireless communication terminal may insert padding into a PPDU including an ACK within a length indicated by the base wireless communication terminal, and transmit the PPDU to the base wireless communication terminal. In this case, the padding may be a padding of the MAC layer. Also, the padding may be the padding of the physical layer. In another specific embodiment, the LR wireless communication terminal may adjust the MCS of the PPDU including the ACK according to the length indicated by the base wireless communication terminal. For example, the LR wireless communication terminal may lower the MCS so that the length of the PPDU including the ACK becomes the length indicated by the base wireless communication terminal. In another specific embodiment, the LR wireless communication terminal may repeatedly insert the same MPDU into a PPDU including an ACK within a length indicated by the base wireless communication terminal, and transmit the PPDU to the base wireless communication terminal. Also, the base wireless communication terminal may indicate the length of the UL PPDU to the LR wireless communication terminal using the DL MU PPDU.

In the embodiment of FIG. 12(b), the LR wireless communication terminal and the non-LR wireless communication terminal receive the DL MU mixed PPDU from the base wireless communication terminal. The LR wireless communication terminal and the non-LR wireless communication terminal transmit the UL MU mixed PPDU to the base wireless communication terminal. In this case, the LR wireless communication terminal and the non-LR wireless communication terminal transmit ACK and data together. Thereafter, the LR wireless communication terminal and the non-LR wireless communication terminal receive the DL MU mixed PPDU including the ACK from the base wireless communication terminal.

The base wireless communication terminal may indicate the length of the UL PPDU to the LR wireless communication terminal using the trigger frame in the above-described embodiment. Therefore, the LR wireless communication terminal may receive the trigger frame from the base wireless communication terminal and transmit the UL PPDU according to the length indicated by the trigger frame. Also, in the above-described embodiments, the LR wireless communication terminal may transmit the Buffer Status Report (BSR) while transmitting the UL PPDU to the base wireless communication terminal. In this case, the BSR may indicate information on the amount of data remaining in the transmission buffer of the LR wireless communication terminal.

In the embodiment of FIG. 12(c), the LR wireless communication terminal and the non-LR wireless communication terminal receive the DL MU mixed PPDU including a trigger frame from the base wireless communication terminal. The LR wireless communication terminal and the non-LR wireless communication terminal transmit the UL MU mixed PPDU based on the trigger frame. Specifically, the LR wireless communication terminal and the non-LR wireless communication terminal transmit the UL MU mixed PPDU according to the length indicated by the trigger frame. The LR wireless communication terminal and the non-LR wireless communication terminal receive the DL MU PPDU including the ACK from the base wireless communication terminal.

The base wireless communication terminal may trigger the uplink transmission of any LR wireless communication terminal using the trigger frame in the above-described embodiment. Specifically, the base wireless communication terminal may set the value of the AID of the wireless communication terminal corresponding to the RU to a predetermined value, and trigger an uplink transmission of a random LR wireless communication terminal to the corresponding RU. In this case, the predetermined value may be an AID that is not allocated to the HE wireless communication terminal. Specifically, the predetermined value may be 2046. In yet another specific embodiment, the predetermined value may be 2047.

Further, the LR wireless communication terminal may arbitrarily access the RU indicated by the trigger frame based on the value of the parameter indicated by the trigger frame. Specifically, the LR wireless communication terminal may select a random value within a certain range, and determine whether to perform random access by comparing a random value with a value of a parameter indicated by the trigger frame. For example, the LR wireless communication terminal may select a random value within a certain range, and access the RU indicated by the trigger frame when the random value is larger than the value of the parameter indicated by the trigger frame.

In another specific embodiment, the LR wireless communication terminal may select a random value within a certain range, and may reduce a random value according to reception of a trigger frame indicating random access. In this case, when the random value becomes 0, the LR wireless communication terminal may access the RU indicated by the trigger frame. Specifically, the LR wireless communication terminal may reduce the random value by the number of trigger frames indicating the random access received by the LR wireless communication terminal. In addition, the range for selecting a random value may be determined according to the number of RUs that may be arbitrarily accessed. Specifically, in relation to the range for selecting a random value, as the number of arbitrarily accessible RUs is larger, the range for selecting a random value may be larger. In addition, when the random value becomes 0, when there are a plurality of RUs that may be randomly accessed, the LR wireless communication terminal may randomly select and access any one of the RUs that may randomly be accessed.

In the embodiment of FIG. 12(d), the LR wireless communication terminal and the non-LR wireless communication terminal receive the DL MU mixed PPDU including the trigger frame TF-R triggering the random access from the base wireless communication terminal. The LR wireless communication terminal and the non-LR wireless communication terminal randomly access the RU indicated by the trigger frame on the basis of the trigger frame. The LR wireless communication terminal and the non-LR wireless communication terminal transmit data through the RU that is randomly accessed. Specifically, the LR wireless communication terminal and the non-LR wireless communication terminal transmit the UL MU mixed PPDU according to the length indicated by the trigger frame. The LR wireless communication terminal and the non-LR wireless communication terminal receive the DL MU PPDU including the ACK from the base wireless communication terminal.

The format of the PPDU used in the embodiments in which the LR wireless communication terminal and the non-LR wireless communication terminal simultaneously receive data or transmit data has been described with reference to FIGS. 10 to 12. An RU allocation method used in embodiments in which the LR wireless communication terminal and the non-LR wireless communication terminal simultaneously receive data is described with reference to FIGS. 13 to 15.

Figure 13:
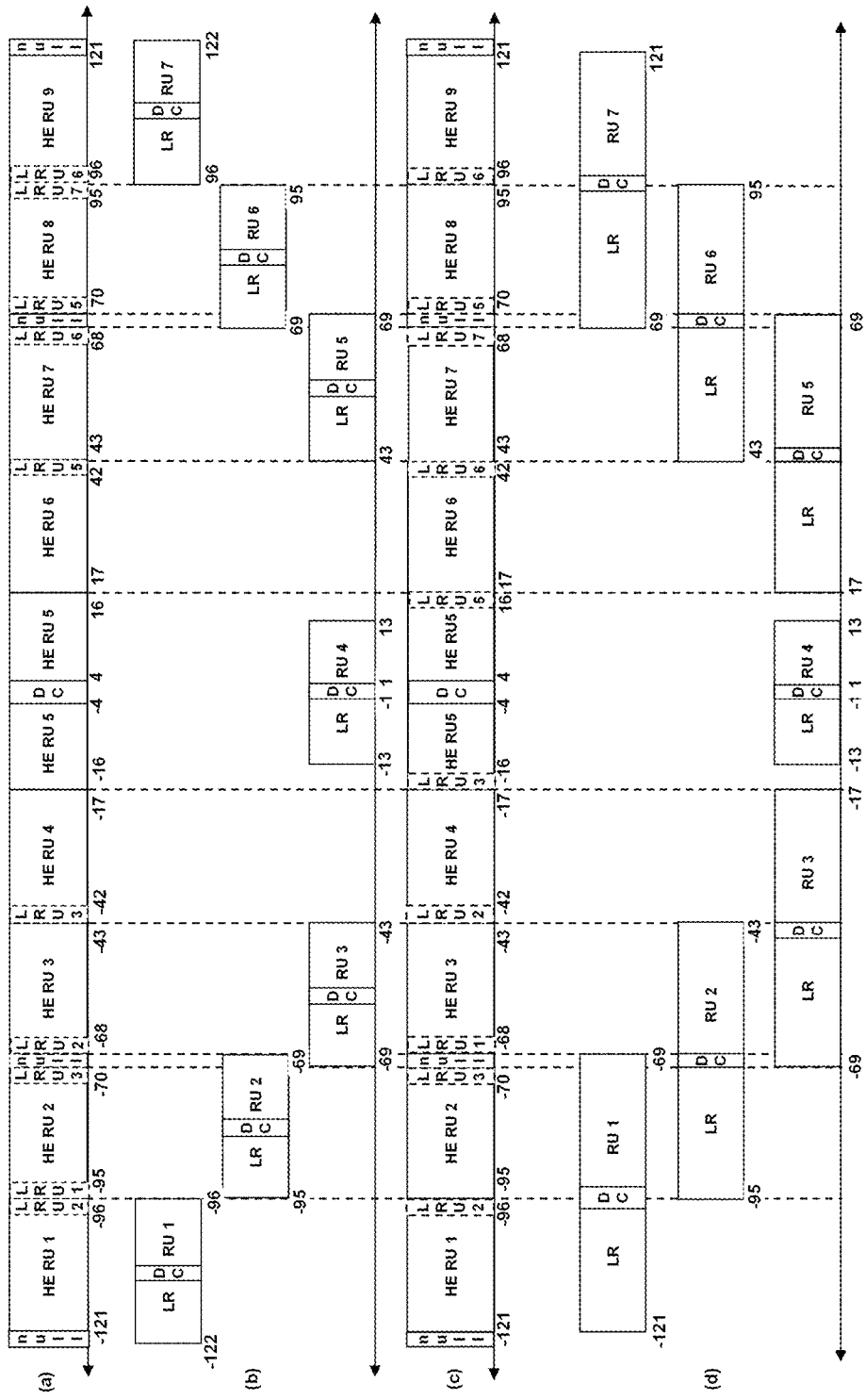
FIG. 13 shows a specific RU allocation method when a wireless communication terminal according to an embodiment of the present invention transmits a composite PPDU.

FIG. 13 shows a specific RU allocation method when a wireless communication terminal according to an embodiment of the present invention transmits a composite PPDU.

The base wireless communication terminal may perform OFDMA communication with a plurality of HE wireless communication terminals using 256 subcarriers in a frequency band having a 20 MHZ bandwidth. In this case, the base wireless communication terminal may allocate RUs to up to nine HE wireless communication terminals. Specifically, the base wireless communication terminal may set subcarriers whose subcarrier indices are [−128: −123] and [123: 127] among a total of 256 subcarriers [−128: 127] as guard carriers. Also, the base wireless communication terminal may set a subcarrier whose subcarrier index corresponds to [−3: 3] as a DC subcarrier. Therefore, the base wireless communication terminal or the HE wireless communication terminal may transmit data using the remaining subcarriers except the guard subcarrier and the DC subcarrier. Therefore, the base wireless communication terminal may allocate any one RU of HE RU1[−121: −96], HE RU2[−95: −70], HE RU3[−68: −43], HE RU4[−42: −17], HE RU5[−16: −4, 4:16], HE RU6[17: 42], HE RU7[43: 68], HE RU8[70: 95], and HE RU9[96: 121] to nine HE wireless communication terminals as shown in FIG. 13(a). In this case, the four subcarriers corresponding to the subcarrier indices −122, −69, 69, and 122 may correspond to null subcarriers where data is not transmitted. The RU allocation method when the RU allocated to the LR wireless communication terminal and the RU allocated to the non-LR wireless communication terminal are continuous will be described with reference to through FIG. 13(b) and FIG. 13(d).

The LR wireless communication terminal may not receive or transmit the entire minimum frequency band in which the non-LR wireless communication terminal communicates. Since the RU allocated to the LR wireless communication terminal is required to include a DC subcarrier, it requires more subcarriers than RUs allocated to existing non-LR wireless communication terminals. Therefore, when the RU allocated to the LR wireless communication terminal and the RU allocated to the non-LR wireless communication terminal are continuous, the base wireless communication terminal may transmit at least one subcarrier adjacent to the RU of the LR wireless communication terminal among the subcarriers located in the RU allocated to the non-LR wireless communication terminal with a transmission power of a specified size. In this case, when the RU allocated to the LR wireless communication terminal and the RU allocated to the non-LR wireless communication terminal are not continuous, the designated size is smaller than the size of the power for transmitting the corresponding subcarrier. For example, the specified size may be zero. That is, the base wireless communication terminal may null at least one subcarrier adjacent to the RU of the LR wireless communication terminal among the subcarriers located in the RU allocated to the non-LR wireless communication terminal. In this case, the nulling indicates that data is not transmitted through the corresponding subcarrier. Also, the base wireless communication terminal may signal information related to transmission power adjustment or nulling to the non-LR wireless communication terminal. Through these embodiments, it is possible to prevent signal interference caused when a non-LR signal and an LR signal are transmitted through an adjacent RU.

Specifically, the base wireless communication terminal may perform OFDMA communication with a plurality of HE wireless communication terminals and at least one LR wireless communication terminal using 256 subcarriers in a frequency band having a bandwidth of 20 MHz. In this case, the LR wireless communication terminal may receive allocated 32 subcarriers. The base wireless communication terminal sets the subcarriers corresponding to the subcarrier indices [−16: −14] and [14: 15] as guard subcarriers, and sets the subcarriers corresponding to the subcarrier index [0] as DC. The base wireless communication terminal or the LR wireless communication terminal may transmit data using 26 subcarriers corresponding to subcarrier indices [−13: −1] and [1: 13] excluding guard subcarriers and DC subcarriers as shown in the LR RU4 in FIG. 13(b). The base wireless communication terminal may allocate any one of LR RU1 [−122: −96], LR RU2 [−95: −69], LR RU3 [−69: −43], LR RU4 [−13: −13], LR RU5 [43: 69], LR RU6 [69: 95], and LRU7 [96: 122] to the LR wireless communication terminal. The LR wireless communication terminal may receive data through the RU allocated to the LR wireless communication terminal.

As described above, the base wireless communication terminal may adjust the size of at least one subcarrier adjacent to the RU allocated to the LR wireless communication terminal among the subcarriers located in the RU allocated to the HE wireless communication terminal. Specifically, the base wireless communication terminal may reduce the transmission power of two subcarriers adjacent to the RU allocated to the LR wireless communication terminal among the subcarriers located in the RU allocated to the HE wireless communication terminal. For example, the base wireless communication terminal may null two subcarriers adjacent to an RU allocated to an LR wireless communication terminal among subcarriers located in an RU allocated to the HE wireless communication terminal. Also, the base wireless communication terminal may signal information related to transmission power adjustment or nulling to the HE wireless communication terminal.

In another specific embodiment, the LR wireless communication terminal may receive allocated 64 subcarriers. The base wireless communication terminal sets the subcarriers corresponding to the subcarrier indices [−32: −27] and [27: 31] as guard subcarriers, and sets the subcarriers corresponding to the subcarrier index [0] as DC. The base wireless communication terminal or the LR wireless communication terminal may transmit data using 52 subcarriers corresponding to subcarrier indices [−26: −1] and [1: 26] excluding guard subcarriers and DC subcarriers as shown in the LR RU4 in FIG. 13(d). The base wireless communication terminal may allocate any one of LR RU1[−121: −69], LR RU2[−95: −43], LR RU3[−69: −17], LR RU4[−13: −13], LR RU5[17: 69], LR RU6[43: 95], and LR RU7[69: 121] to the LR wireless communication terminal as shown in FIG. 13(d).

In addition, the base wireless communication terminal may reduce the transmission power of five subcarriers adjacent to the RU allocated to the LR wireless communication terminal among the subcarriers located in the RU allocated to the HE wireless communication terminal. For example, as shown in FIG. 13(c), the base wireless communication terminal may null five subcarriers adjacent to an RU allocated to an LR wireless communication terminal among subcarriers located in an RU allocated to the HE wireless communication terminal. Also, the base wireless communication terminal may signal information related to transmission power adjustment or nulling to the HE wireless communication terminal. Specifically, the base wireless communication terminal may signal to the HE wireless communication terminal information related to transmission power adjustment or nulling using a signaling field. In this case, the signaling field may be the HE-SIG-B field described above.

Further, in the above-described embodiments, when the MCS of the subcarrier transmitted by the LR wireless communication terminal or the subcarrier received by the LR wireless communication terminal is equal to or smaller than a certain size, the transmission power adjustment for the subcarriers located in the RU allocated to the non-LR wireless communication terminal may not be performed. This is because, when the MCS is equal to or less than a certain size, it may be determined that the signal transmitted through the subcarrier is robust. This is because when the MCS of the subcarrier is equal to or smaller than a certain size, it is less affected by the peripheral signal.

Figure 14:
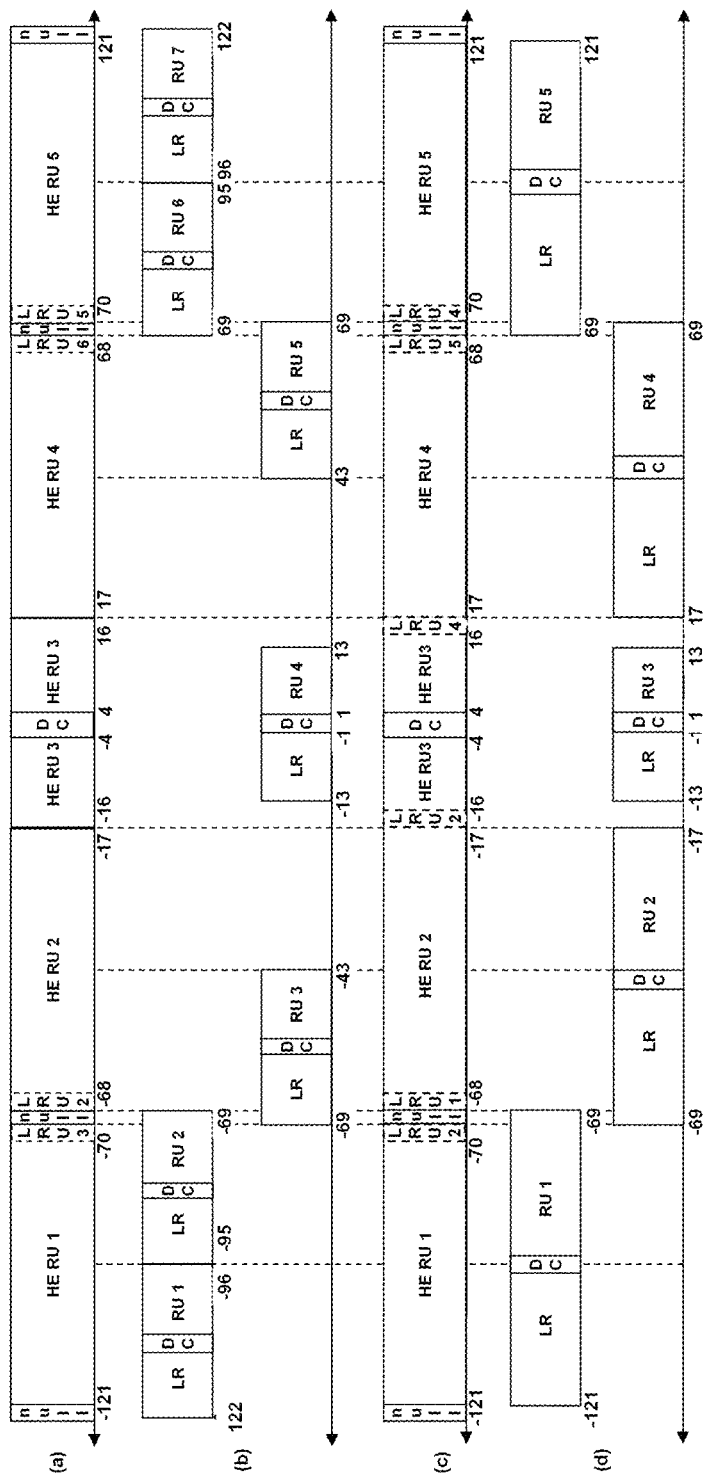
FIG. 14 shows an RU allocation method when a wireless communication terminal according to another embodiment of the present invention transmits a composite PPDU.

FIG. 14 shows an RU allocation method when a wireless communication terminal according to another embodiment of the present invention transmits a composite PPDU.

As described above, the base wireless communication terminal may perform OFDMA communication with a plurality of HE wireless communication terminals using 256 subcarriers in a frequency band having a bandwidth of 20 MHz. The base wireless communication terminal may set subcarriers whose subcarrier indices corresponds to [−128: −123] and [123: 127] as guard carriers, and set subcarriers whose subcarrier indices correspond to [−3: 3] as DC subcarriers among a total of 256 subcarriers [−128: 127]. Therefore, the base wireless communication terminal may transmit data using the remaining subcarriers except the guard subcarrier and the DC subcarrier. The base wireless communication terminal may allocate any one RU of HE RU1[−121: −70], HE RU2[−68: −17], HE RU3[−16: −4, 4:16], HE RU4[17: 68], and HE RU5[70: 121] to nine HE wireless communication terminals as shown in FIG. 14(a). In this case, the four subcarriers corresponding to subcarrier indices −122, −69, 69, and 122 are null subcarriers where data is not transmitted.

As described above, the LR wireless communication terminal may receive allocated 32 subcarriers in a frequency band having a bandwidth of 20 MHz. The base wireless communication terminal sets the subcarriers corresponding to the subcarrier indices [46:44] and [14:15] as guard subcarriers, and sets the subcarriers corresponding to the subcarrier index [0] as DC. The base wireless communication terminal may transmit data using 26 subcarriers corresponding to subcarrier indices [−13: −1] and [1: 13] excluding guard subcarriers and DC subcarriers as shown in the LR RU4 in FIG. 14(b). The base wireless communication terminal may allocate any one of LR RU1[−122: −96], LR RU2[−95: −69], LR RU3[−69: −43], LR RU4[−13: −13], LR RU5[43: 69], LR RU6[69: 95], and LRU7[96: 122] to the LR wireless communication terminal. In this case, the base wireless communication terminal may allocate a plurality of continuous RUs to the plurality of LR wireless communication terminals, respectively. Specifically, the base wireless communication terminal may allocate LR RU1 and LR RU2 to two LR wireless communication terminals, respectively, as in the embodiment of FIG. 14(b). In addition, the base wireless communication terminal may allocate LR RU6 and LR RU7 to the two LR wireless communication terminals, respectively, as in the embodiment of FIG. 14(b). In this case, if the RU allocated to the LR wireless communication terminal is continuous with the RU allocated to the HE wireless communication terminal, the base wireless communication terminal may reduce the transmission power of two subcarriers adjacent to the RU allocated to the LR wireless communication terminal among the subcarriers located in the RU allocated to the HE wireless communication terminal. For example, as shown in FIG. 14(a), the base wireless communication terminal may null two subcarriers adjacent to an RU allocated to an LR wireless communication terminal among subcarriers located in an RU allocated to the HE wireless communication terminal. Also, the base wireless communication terminal may signal information related to transmission power adjustment or nulling to the HE wireless communication terminal.

In another specific embodiment, as described above, the LR wireless communication terminal may receive allocated 64 subcarriers in a frequency band having a bandwidth of 20 MHz. The base wireless communication terminal sets the subcarriers corresponding to the subcarrier indices [−32: −27] and [27: 31] as guard subcarriers, and sets the subcarriers corresponding to the subcarrier index [0] as DC. The base wireless communication terminal may transmit data using 52 subcarriers corresponding to subcarrier indices [−26: −1] and [1: 26] excluding guard subcarriers and DC subcarriers. The base wireless communication terminal may allocate any one of LR RU1[−121: −69], LR RU2[−95: −43], LR RU3[−69: −17], LR RU4[−13: −13], LR RU5[17: 69], LR RU6[43: 95], and LR RU7[69: 121] to the LR wireless communication terminal as shown in FIG. 14(d).

In addition, the base wireless communication terminal may reduce the transmission power of five subcarriers adjacent to the RU allocated to the LR wireless communication terminal among the subcarriers located in the RU allocated to the HE wireless communication terminal. For example, as shown in FIG. 14(c), the base wireless communication terminal may null five subcarriers adjacent to an RU allocated to an LR wireless communication terminal among subcarriers located in an RU allocated to the HE wireless communication terminal. Also, the base wireless communication terminal may signal information related to transmission power adjustment or nulling to the HE wireless communication terminal. Also, the base wireless communication terminal may signal information related to transmission power adjustment or nulling to the HE wireless communication terminal. Specifically, the base wireless communication terminal may signal to the HE wireless communication terminal information related to transmission power adjustment or nulling using a signaling field. In this case, the signaling field may be the HE-SIG-B field described above.

Further, in the above-described embodiments, when the MCS of the subcarrier transmitted by the LR wireless communication terminal or the subcarrier received by the LR wireless communication terminal is equal to or smaller than a certain size, the transmission power adjustment for the subcarriers located in the RU allocated to the non-LR wireless communication terminal may not be performed. This is because when the MCS of the subcarrier is equal to or less than a certain size, a signal transmitted through the corresponding subcarrier may be less affected by the peripheral signal.

Figure 15:
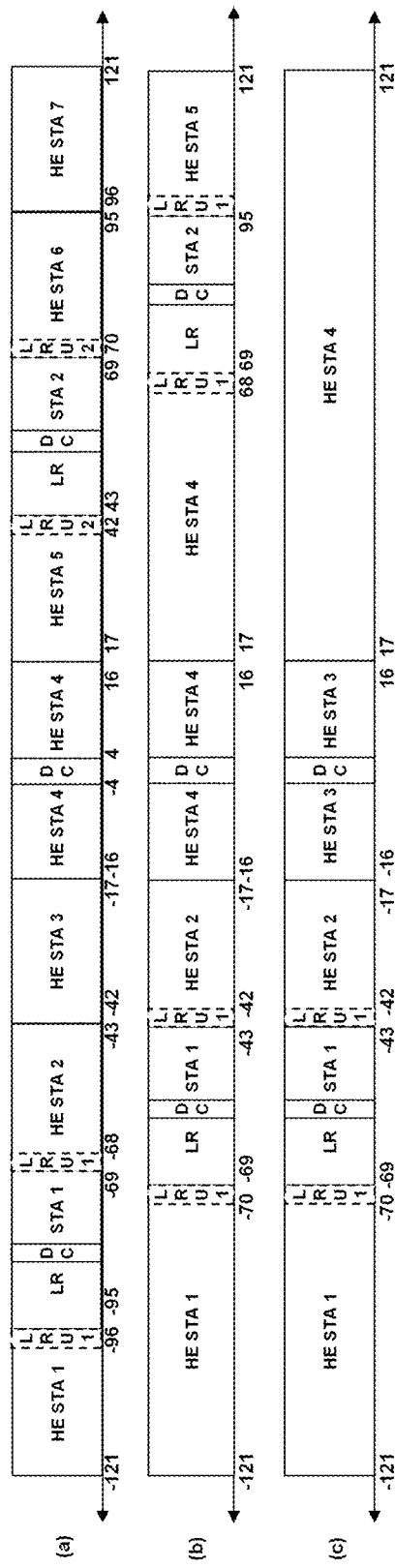
FIG. 15 shows RUs allocated to the LR wireless communication terminals according to the embodiments described with reference to FIGS. 14 and 15.

FIG. 15 shows RUs allocated to the LR wireless communication terminals according to the embodiments described with reference to FIGS. 14 and 15.

FIG. 15(a) shows RUs allocated to two LR wireless communication terminals and seven HE wireless communication terminals when the base wireless communication terminal, two LR wireless communication terminals, and seven HE wireless communication terminals communicate with each other. FIG. 15(b) shows RUs allocated to two LR wireless communication terminals and five HE wireless communication terminals when the base wireless communication terminal, two LR wireless communication terminals, and five HE wireless communication terminals communicate with each other. FIG. 15(c) shows RUs allocated to one LR wireless communication terminal and four HE wireless communication terminals when the base wireless communication terminal, one LR wireless communication terminal, and four HE wireless communication terminals communicate with each other.

In the embodiment of FIGS. 15(a) to 15(c), when the base wireless communication terminal transmits the mixed PPDU to the LR wireless communication terminal and the HE wireless communication terminal, the base wireless communication terminal adjusts the transmission power of at least one subcarrier corresponding to the guard of the LR RU among the plurality of subcarriers located in the RU allocated to the HE wireless communication terminal adjacent to the RU allocated to the LR wireless communication terminal. In this case, the base wireless communication terminal may null the subcarriers corresponding to the guards of the LR RU among the plurality of subcarriers located in the RUs allocated to the HE wireless communication terminals adjacent to the RUs allocated to the LR wireless communication terminals. In addition, the base wireless communication terminal may transmit the subcarriers corresponding to the guard of the LR RU with a lower power than the other subcarriers included in the same RU among the plurality of subcarriers located in the RU allocated to the HE wireless communication terminal adjacent to the RU allocated to the LR wireless communication terminal. Also, the base wireless communication terminal may signal information related to transmission power control or nulling to the HE wireless communication terminal using the HE-SIG-B field. Therefore, when at least one subcarrier located in the RU allocated to the HE wireless communication terminal is null, the HE wireless communication terminal may receive data using subcarriers other than the null subcarrier. Also, when at least one subcarrier located in the RU allocated by the HE wireless communication terminal is transmitted at a power lower than that of the other subcarriers located in the same RU, the HE wireless communication terminal may receive the data by amplifying the power of the subcarrier transmitted with low power. Specifically, the base wireless communication terminal may redundantly transmit data corresponding to subcarriers transmitted at lower power than other subcarriers located in the same RU. In this case, the HE wireless communication terminal may combine the redundantly transmitted subcarriers to receive the redundantly transmitted subcarriers. Through this, the HE wireless communication terminal may amplify the power of the subcarrier.

Figure 16:
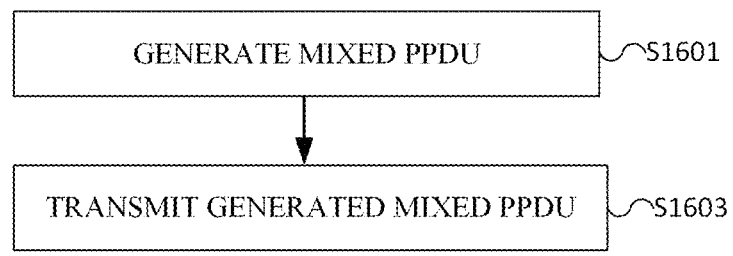
FIG. 16 shows the operation of a wireless communication terminal according to an embodiment of the present invention.

FIG. 16 shows the operation of a wireless communication terminal according to an embodiment of the present invention.

The base wireless communication terminal generates a mixed PPDU (S1601). The mixed PPDU may include both data for the LR wireless communication terminal and data for the non-LR wireless communication terminal. As described above, the LR PPDU including only the data for the LR wireless communication terminal has a narrower bandwidth than the minimum bandwidth of the non-LR PPDU including only the data for the non-LR wireless communication terminal. The LR wireless communication terminal may receive the LR PPDU. The non-LR wireless communication terminal may receive the non-LR PPDU. When the non-LR PPUD and the LR PPDU are transmitted with the same power, the transmission range of the LR PPDU is wider than the transmission range of the non-LR PPDU.

The base wireless communication terminal may divide the frequency band through which the mixed PPDU is transmitted, and may transmit the non-legacy training signal and the non-LR data field, and the LR preamble and the LR data field through the divided frequency band. The base wireless communication terminal allocates an RU to the LR wireless communication terminal and the non-LR wireless communication terminal. In this case, the base wireless communication terminal may allocate an RU as in the embodiments described with reference to FIG. 13 to FIG. 15.

The base wireless communication terminal may set a value for signaling the length of the signaling field of the mixed PPDU transmitted before the training signal for the non-LR wireless communication terminal to be longer than the actual length of the signaling field. In this case, the training signal may include a short training signal and a long training signal. The short training signal is a training signal having a relatively short length as compared with the long training signal. In addition, the short training signal may be transmitted earlier than the long training signal. Also, the base wireless communication terminal may set a value for signaling the length of the signaling field to the sum of the length of the signaling field of the mixed PPDU and the short training signal for the LR wireless communication terminal. In this case, the signaling field may be the HE-SIG-B field described above. The specific format of the mixed PPDU may be the same as that of the embodiments described with reference to FIGS. 10 to 12.

The base wireless communication terminal transmits the generated mixed PPDU (S1603). The base wireless communication terminal may transmit the training signal for the LR wireless communication terminal included in the mixed PPDU and the training signal for the non-LR wireless communication terminal included in the mixed PPDU as a separate OFDM symbol. Specifically, the base wireless communication terminal may transmit a training signal for the LR wireless communication terminal before starting the transmission of the training signal for the non-LR wireless communication terminal. Also, the base wireless communication terminal may transmit a short training signal for the non-LR wireless communication terminal as a long training signal for the LR wireless communication terminal. Also, the base wireless communication terminal may start data field transmission for the LR wireless communication terminal included in the mixed PPDU regardless of the transmission start time point of the data field for the non-LR wireless communication terminal included in the mixed PPDU. The base wireless communication terminal may start data field transmission for the LR wireless communication terminal included in the mixed PPDU earlier than the transmission start time point of the data field for the non-LR wireless communication terminal included in the mixed PPDU.

The LR wireless communication terminal receiving the mixed PPDU may obtain the data indicated by the LR data field from the mixed PPDU. Specifically, the LR wireless communication terminal receiving the mixed PPDU may receive the LR data based on the LR preamble. In a specific embodiment, the LR wireless communication terminal receiving the mixed PPDU may receive the LR signaling field based on the LR training signal. In this case, the specific format of the non-legacy training signal and the LR training signal may be the same as the embodiment described with reference to FIG. 8 to FIG. 9.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal wirelessly communicating with a base wireless communication terminal, the wireless communication terminal comprising:
   a transceiver; and
   a processor,
   wherein the processor is configured to:
   receive a trigger frame which triggers uplink transmission, wherein the trigger frame indicates a physical layer protocol data unit (PPDU) format of the uplink transmission among a plurality of PPDU formats of the uplink transmission, and
   perform the uplink transmission according to the PPDU format of the uplink transmission indicated by the trigger frame,
   wherein the uplink transmission is included in a mixed uplink transmission,
   the mixed uplink transmission is performed through a mixed PPDU which is for a simultaneous transmission of first format PPDU from the wireless communication terminal and second format PPDU from a wireless communication terminal which is different from the wireless communication terminal using orthogonal frequency-division multiple access (OFDMA),
   wherein the first format PPDU is for non-legacy wireless communication terminal and the second format PPDU is for legacy wireless communication terminal,
   wherein a format of a preamble of the first format PPDU is different from a format of a preamble of the second format PPDU,
   wherein the first format PPDU and the second format PPDU include a common signaling field, and
   wherein the first format PPDU includes a signaling field which is not included in the second format PPDU and is located after the common signaling field.

2. The wireless communication terminal of claim 1, wherein the second format PPDU of the uplink transmission is legacy High Efficiency (HE) PPDU of the uplink transmission and is for legacy HE wireless communication terminal.

3. The wireless communication terminal of claim 1, wherein the trigger frame indicates the first format PPDU of the uplink transmission by including a specific value of an association identifier (AID).

4. The wireless communication terminal of claim 1, wherein the first format PPDU and the second format PPDU is simultaneously transmitted after a specific time interval of Short Inter-Frame Spacing (SIFS) after receiving the trigger frame.

5. The wireless communication terminal of claim 1, wherein the first format PPDU and the second format PPDU is transmitted by using an independent Modulation and Coding Scheme (MCS) indicated by the trigger frame.

6. The wireless communication terminal of claim 1, wherein the first format PPDU and the second format PPDU is transmitted by using a same PPDU length indicated by the trigger frame.

7. The wireless communication terminal of claim 1, wherein the processor is configured to receive an acknowledgement on the first format PPDU from the base wireless communication terminal, wherein the acknowledgement is simultaneously transmitted with an acknowledgement on the second format PPDU using a downlink PPDU which is subsequent to the mixed uplink transmission.

8. A method of operating a wireless communication terminal wirelessly communicating with a base wireless communication terminal, the method comprising:
   receiving a trigger frame which triggers uplink transmission, wherein the trigger frame indicates a physical layer protocol data unit (PPDU) format of the uplink transmission among a plurality of PPDU formats of the uplink transmission, and
   performing the uplink transmission according to the PPDU format of the uplink transmission indicated by the trigger frame,
   wherein the uplink transmission is included in a mixed uplink transmission,
   the mixed uplink transmission is performed through a mixed PPDU which is for a simultaneous transmission of first format PPDU from the wireless communication terminal and second format PPDU from a wireless communication terminal which is different from the wireless communication terminal using orthogonal frequency-division multiple access (OFDMA),
   wherein the first format PPDU is for non-legacy wireless communication terminal and the second format PPDU is for legacy wireless communication terminal,
   wherein a format of a preamble of the first format PPDU is different from a format of a preamble of the second format PPDU,
   wherein the first format PPDU and the second format PPDU include a common signaling field, and
   wherein the first format PPDU includes a signaling field which is not included in the second format PPDU and is located after the common signaling field.

9. The method of claim 8, wherein the second format PPDU of the uplink transmission is legacy High Efficiency (HE) PPDU of the uplink transmission and is for legacy HE wireless communication terminal.

10. The method of claim 8, wherein the trigger frame indicates the first format PPDU of the uplink transmission by including a specific value of an association identifier (AID).

11. The method of claim 8, wherein the first format PPDU and the second format PPDU is simultaneously transmitted after a specific time interval of Short Inter-Frame Spacing (SIFS) after receiving the trigger frame.

12. The method of claim 8, wherein the first format PPDU and the second format PPDU is transmitted by using an independent Modulation and Coding Scheme (MCS) indicated by the trigger frame.

13. The method of claim 8, wherein the first format PPDU and the second format PPDU is transmitted by using a same PPDU length indicated by the trigger frame.

14. The method of claim 8, the method further comprises receiving an acknowledgement on the first format PPDU from the base wireless communication terminal, wherein the acknowledgement is simultaneously transmitted with an acknowledgement on the second format PPDU using a downlink PPDU which is subsequent to the mixed uplink transmission.

* * * * *